US010032144B1

(12) United States Patent
Jacob et al.

(10) Patent No.: US 10,032,144 B1
(45) Date of Patent: Jul. 24, 2018

(54) SYSTEMS AND METHODS FOR ENHANCED DINING AND OTHER EXPERIENCES USING A MOBILE DEVICE

(71) Applicant: JPMorgan Chase Bank, N.A., New York, NY (US)

(72) Inventors: Anil Jacob, Mickleton, NJ (US); Joseph Arnone, Swedesboro, NJ (US); Brian Gantert, Hockessin, DE (US); Manning Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 381 days.

(21) Appl. No.: 14/582,653

(22) Filed: Dec. 24, 2014

Related U.S. Application Data

(63) Continuation-in-part of application No. 14/047,887, filed on Oct. 7, 2013.

(60) Provisional application No. 61/837,916, filed on Jun. 21, 2013.

(51) Int. Cl.
    *G06Q 40/00* (2012.01)
    *G06Q 20/10* (2012.01)
    *G06Q 20/34* (2012.01)

(52) U.S. Cl.
    CPC .......... *G06Q 20/102* (2013.01); *G06Q 20/34* (2013.01)

(58) Field of Classification Search
    CPC ............ G06Q 20/322; G06Q 30/0207; G06Q 20/401; G06Q 20/20; G06Q 20/32; G06Q 20/40; G06Q 50/01
    See application file for complete search history.

(56) References Cited

U.S. PATENT DOCUMENTS

| | | | |
|---|---|---|---|
| 2004/0088257 A1* | 5/2004 | Wong | G06Q 20/105 705/41 |
| 2005/0216354 A1* | 9/2005 | Bam | G06Q 20/12 705/26.1 |
| 2010/0299212 A1* | 11/2010 | Graylin | G06Q 20/32 705/14.66 |
| 2011/0191184 A1* | 8/2011 | Blackhurst | G06Q 30/02 705/14.57 |
| 2011/0295750 A1* | 12/2011 | Rammal | G06Q 20/12 705/44 |

(Continued)

*Primary Examiner* — Kirsten S Apple
*Assistant Examiner* — Mike Anderson
(74) *Attorney, Agent, or Firm* — Hunton Andrews Kurth LLP

(57) ABSTRACT

Systems and methods for enhanced dining experiences, and other experiences, using a mobile device are disclosed. In one embodiment, the system (1) monitors providing at least one good or service to the customer during the event; the system (2) performing processing to determine cardless payment feature availability including: (a) determining a probable spend of the customer for the event; (b) determining a probable spend acceptable threshold (PSAT) for the event; (c) comparing the probable spend of the customer versus the PSAT, and based on such comparing, determining that the probable spend is within PSAT and, based on such determination, determining that the cardless payment feature is available to the customer; the system (3) generating an invoice; (4) transmitting the invoice to the customer's messaging address; (5) receiving, over the at least one network, an approval for the invoice; and the system (6) charging the customer's account.

17 Claims, 40 Drawing Sheets

(56) References Cited

U.S. PATENT DOCUMENTS

| | | | | |
|---|---|---|---|---|
| 2012/0317027 A1* | 12/2012 | Luk | ............ | G06Q 40/02 705/44 |
| 2013/0166332 A1* | 6/2013 | Hammad | ............ | G06Q 40/10 705/5 |
| 2014/0310030 A1* | 10/2014 | Cheranda | ............ | G06Q 10/02 705/5 |

* cited by examiner

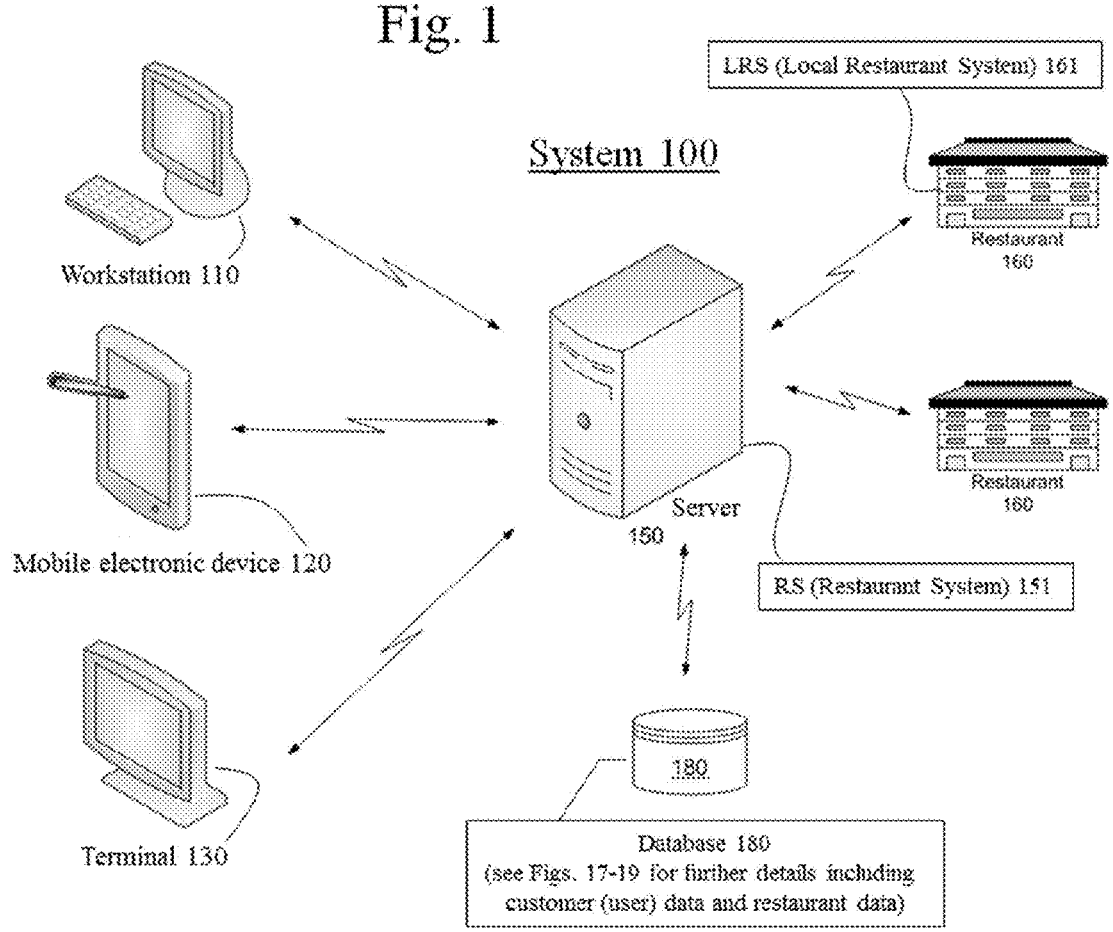

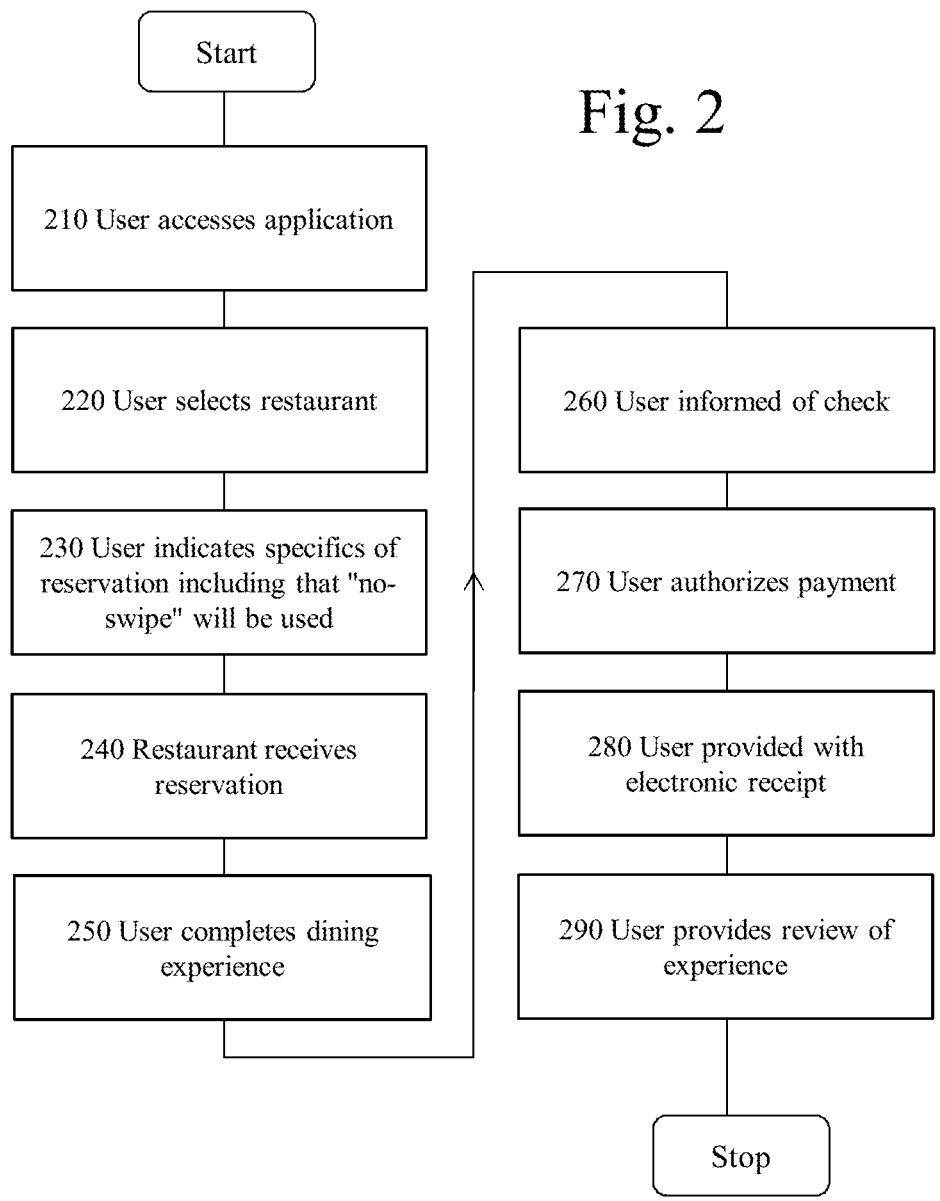

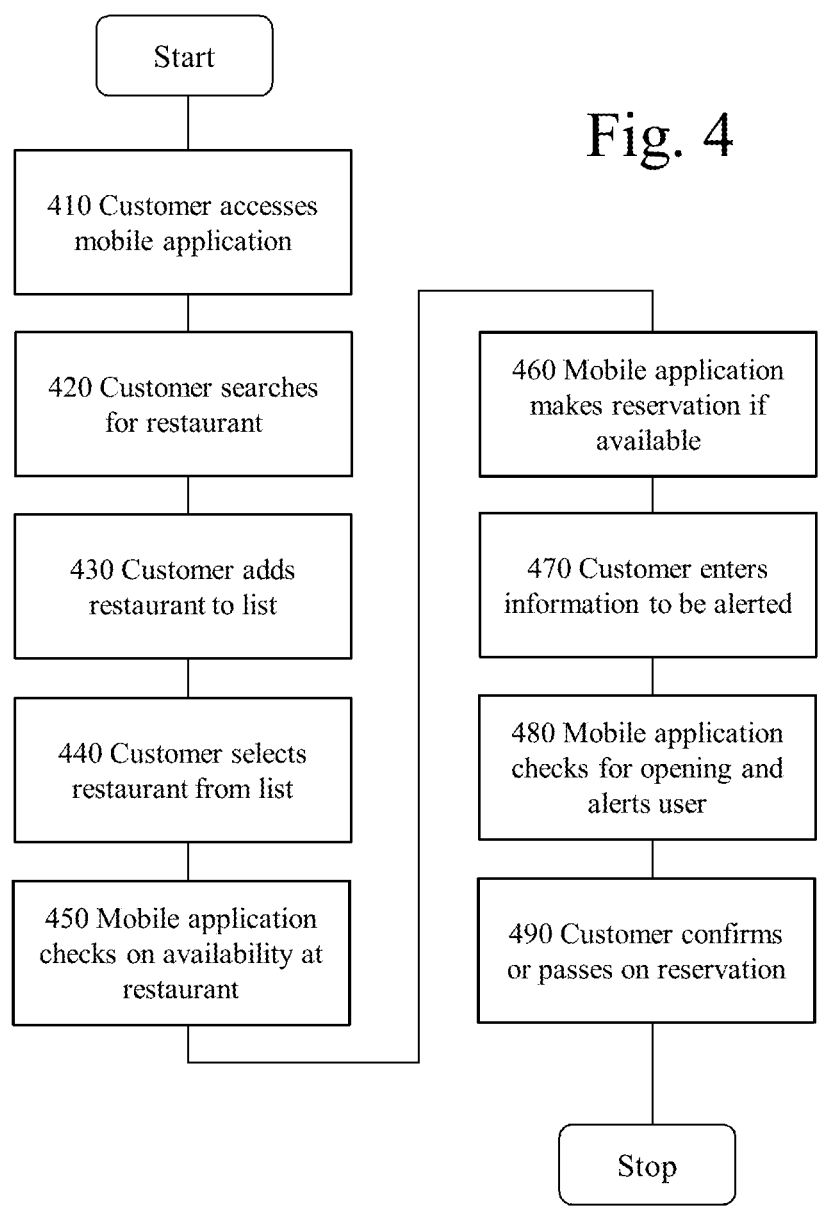

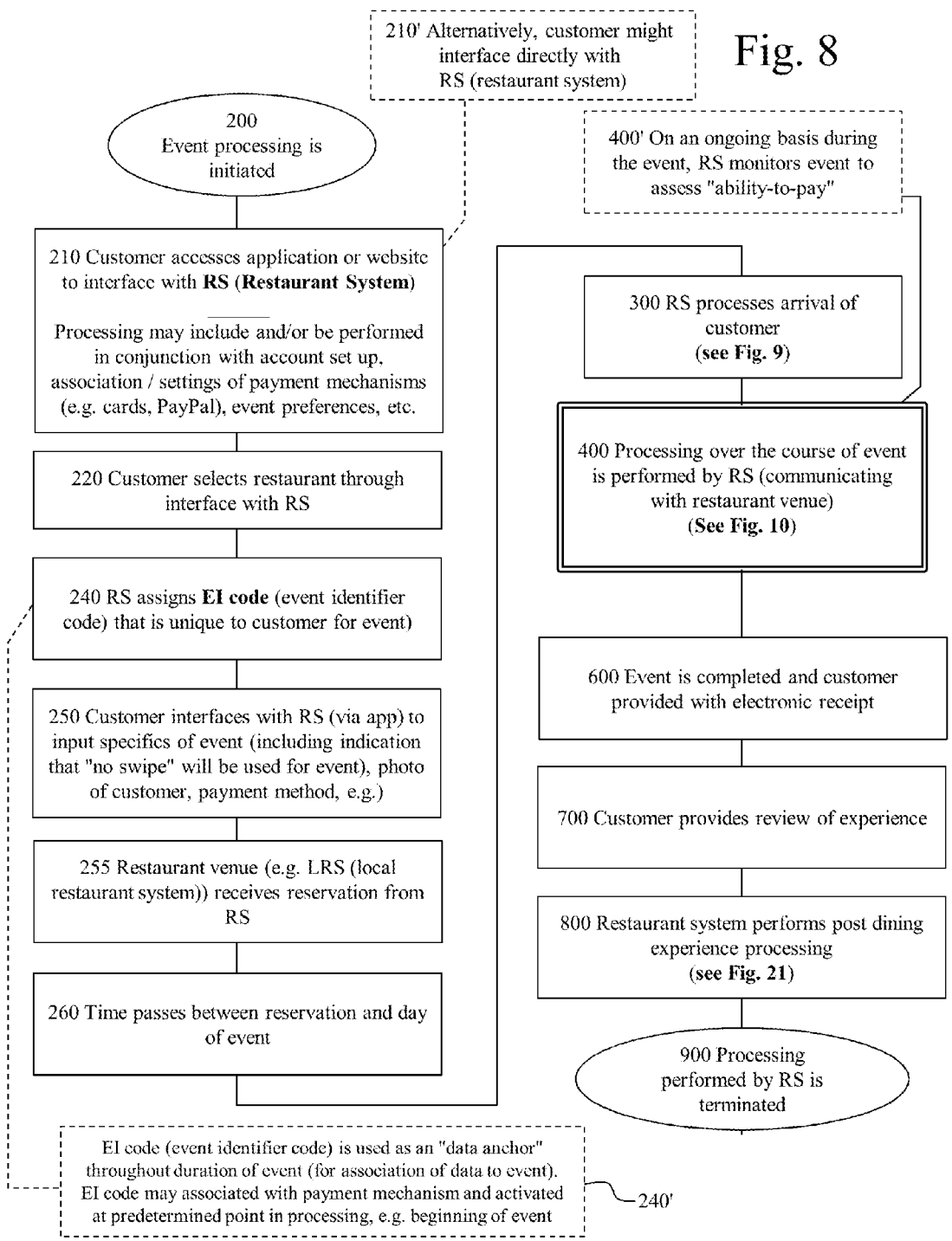

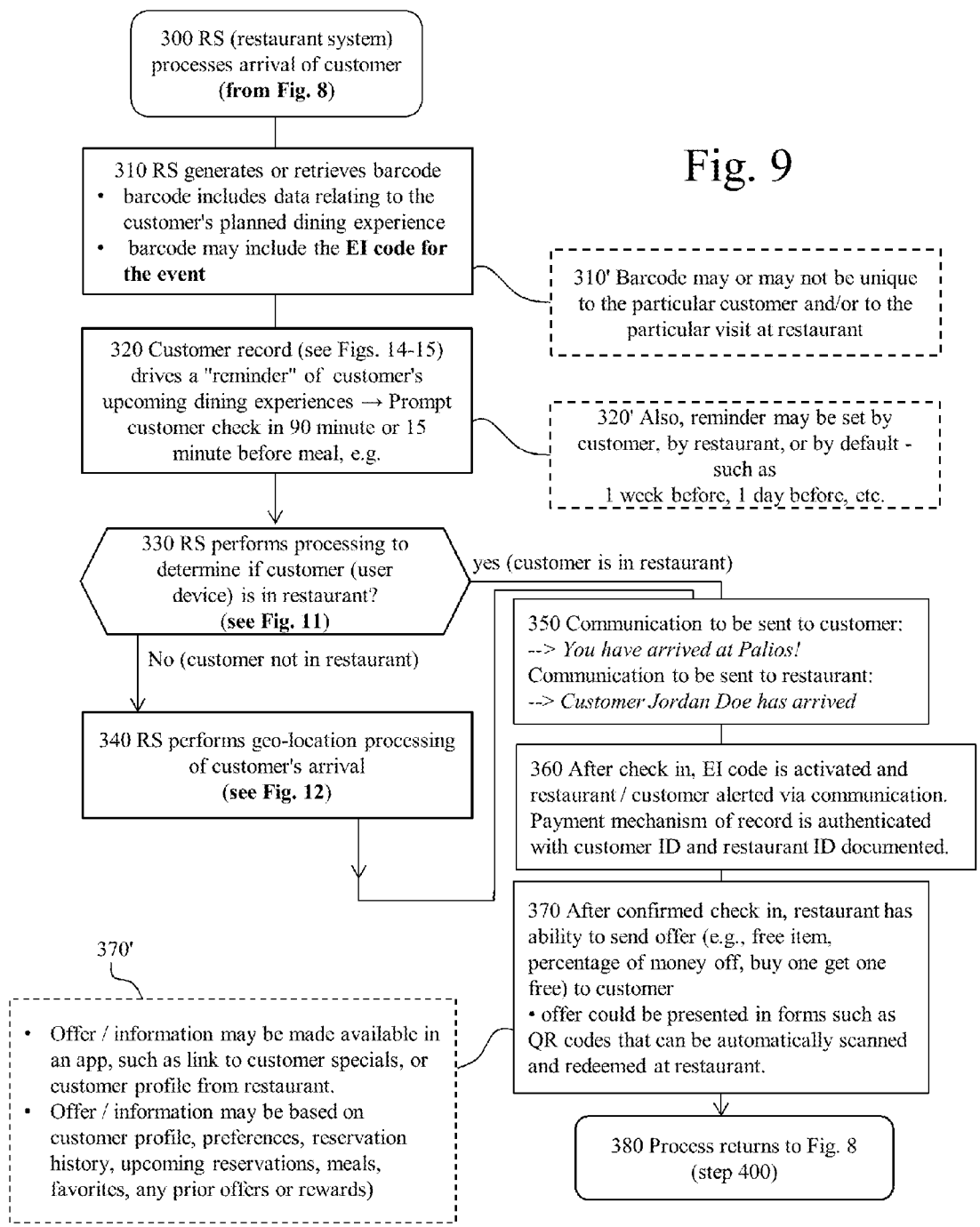

SYSTEMS AND METHODS FOR ENHANCED DINING AND OTHER EXPERIENCES USING A MOBILE DEVICE

RELATED APPLICATIONS

This application is a continuation-in-part application of U.S. application Ser. No. 14/047,887 filed on Oct. 7, 2013, such application claiming priority to U.S. Provisional Patent Application Ser. No. 61/837,916, filed Jun. 21, 2013, the disclosure of both applications incorporated herein, by reference, in their entirety.

BACKGROUND OF THE INVENTION

1. Field of the Invention

The present invention generally relates to the use of mobile devices and, more particularly, to systems and methods for enhanced dining experiences using a mobile device.

2. Description of the Related Art

Mobile devices are ubiquitous. Users of these devices not only use them to place and receive phone calls and receive and send messages, but also to access the Internet. Thus, users can research restaurants and make restaurant reservations from virtually anywhere.

SUMMARY OF THE INVENTION

Systems and methods for enhanced dining experiences, and other experiences, using a mobile device are disclosed. In one embodiment, the system (1) monitors providing at least one good or service to the customer during an event; the system (2) performing processing to determine cardless payment feature availability including: (a) determining a probable spend of the customer for the event; (b) determining a probable spend acceptable threshold (PSAT) for the event; (c) comparing the probable spend of the customer versus the PSAT, and based on such comparing, determining that the probable spend is within PSAT and, based on such determination, determining that the cardless payment feature is available to the customer; the system (3) generating an invoice; (4) transmitting the invoice to the customer's messaging address; (5) receiving, over the at least one network, an approval for the invoice; and the system (6) charging the customer's account.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a block diagram of a system for enhanced dining experiences using a mobile device according to one embodiment;

FIG. 2 depicts a method for enhanced dining experiences using a mobile device according to one embodiment;

FIG. 4 depicts a method for tracking favorite places of interest, according to one embodiment;

FIG. 8 is a high-level flowchart showing aspects of no-swipe processing in accordance with embodiments of the invention.

FIG. 9 is a flowchart showing RS (restaurant system) processing performed in conjunction with the arrival of a user (showing details of FIG. 8) in accordance with one embodiment of the invention.

DETAILED DESCRIPTION OF PREFERRED EMBODIMENTS

Figure 3A:
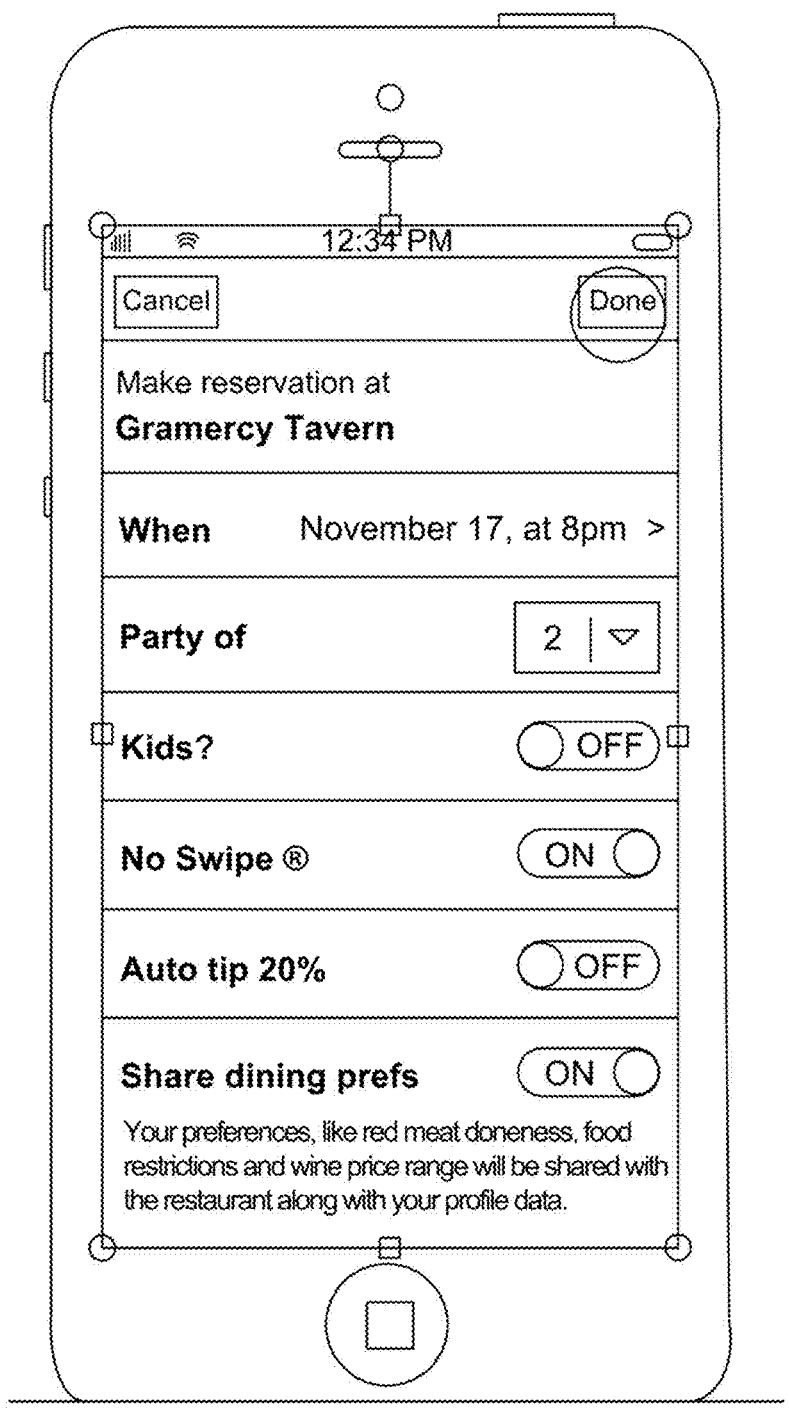
FIGS. 3A-3E depict exemplary screenshots of messages and user interfaces according to embodiments.

Various embodiments of the present invention and their advantages may be understood by referring to FIGS. 1-21, wherein like reference numerals refer to like elements.

The present disclosure is related to U.S. patent application Ser. No. 13/795,394, filed Mar. 12, 2013, U.S. patent application Ser. No. 13/795,306, filed Mar. 12, 2013, and U.S. patent application Ser. No. 12/272,004, filed Nov. 17, 2008. The disclosure of each is hereby incorporated by reference in its entirety.

Embodiments of the invention relate to systems and methods for enhanced dining experiences using a mobile device. For example, embodiments related to different aspects of a mobile dining application that can assist a customer (e.g., a cardholder) in selecting a restaurant, a meal, or any aspect of the dining/reservation process.

It should be noted that although various drawings and description contained herein may refer to restaurants and dining, the systems and methods of the invention disclosed herein are not so limited. As noted above, the systems and methods of the invention have broad applicability to a variety of events including retail experiences, purchasing a plane ticket or some other travel related item, other interests, specialized and otherwise, goods and service providers, etc. and this reference is for exemplary purposes only. Example applications further include, but are not limited to: attending a sporting event; finding a doctor, dentist, lawyer, accountants or other professional; finding a mechanic; attending an entertainment event, such as a movie, theater, etc.; finding a travel destination; finding a tailor, spa, salon, etc. Accordingly, it is appreciated that the systems and methods of the invention may be used in a wide variety of applications, contexts, experiences and environments, for example.

In addition, although the disclosure refers to a "mobile application," it should be recognized that programs, applications, scripts, etc. that are executed by a desktop computer, terminal, or limited mobility device may be used as necessary and/or desired.

According to one embodiment, a "no-swipe" mobile application is disclosed. The mobile application may store the users' payment information, such as a credit card number, on-line transaction account information (e.g., PayPal), debit card number, reward account information (e.g., account numbers), social media coupons (e.g., Groupon, Living Social, etc.), stored value card numbers, gift card numbers, electronic coupons, loyalty card information, etc. When making a reservation using, for example, a mobile device, the user can set dining preferences and indicate that the user will be using the "no-swipe" feature—a feature that does not require the user to physically present a payment instrument at the end of the meal. In one embodiment, the user may not even receive a check, or have to sign for the check, before leaving the restaurant. Instead, at the completion of the meal, the user may simply get up and leave the restaurant. Shortly after leaving, the user will receive a notification that the user's payment instrument has been charged for the meal, and the amount of the charge. If the user has not already specified a gratuity beforehand (e.g., the user has a default 20% gratuity, has specified a certain gratuity for this meal, etc.) the user can then specify a gratuity. The complete payment is then completed, and the user may receive a digital receipt, if desired.

In one embodiment, the mobile application can also check to see if the user can pay for the meal with points, may check the user's payment instrument portfolio to see which payment instrument may have the best rewards or incentives, etc. and notify the user of such.

In one embodiment, the user may also pre-order food (e.g., for kids, a food that may be in limited supply, etc.) using the mobile application. The mobile application may also allow fellow cardholders to split the tab easily. The mobile application can also provide information on the waiter/waitress, such as a name, picture, etc.

At the restaurant, the host/hostess may be informed that the customer will be using "no-swipe" and may be provided with customer information, such as the customer's name, picture, dietary restrictions, past visits, favorite dishes, etc. In one embodiment, information on the members of the customer's party may also be provided if provided by the customer.

In one embodiment, the user may present his or her payment information to the host/hostess before the user is seated at a restaurant, shortly after the user is seated, or anytime during the meal and indicate that the no-swipe feature will be used. In another embodiment, the user may swipe his or her card or otherwise transmit payment information to a terminal, reader, etc. as the user arrives at the restaurant Thus, the user may be able to use no-swipe without advance communications with the restaurant while still enjoying the benefits of being able to depart the restaurant at the user's leisure without having to wait for a check.

In still another embodiment, the user may call the restaurant to make a reservation, be added to a "call ahead list," etc. and may provide information so that the user can use no-swipe. In other embodiments, location-based services (e.g., the GPS location of the user's mobile device, recognition of the user's mobile device by the restaurant's system, social media postings by the user, etc. may be used to initiate the no-swipe service.

According to another embodiment, a "favorite restaurant update" feature is disclosed. Through this feature, the user may discover and save great restaurants to the user's "favorites" list. The mobile application can be set to search for restaurants, search for reservations, set alerts for available tables, and make and confirm reservations. It can further identify restaurants that offer rewards, participate in a rewards network, etc.

In still another embodiment, the user may be able to identify, save and/or share his or her "best ever" meals. This may be a collection of what a user considers to be the best meals that he or she has had at a restaurant, in a city, etc. For example, after a meal, the user may be asked to provide a review. The user may be given several options such as "not coming back," "I liked it," and "best meal ever!" If the user selects "Best meal ever!," the user may be presented with a thank you (e.g., a recipe from the restaurant, discount on the next meal, etc.) and the recommendation may be stored to a database.

Other users can search for and identify other "best ever" meals, and make reservations at restaurants that serve those meals.

Referring to FIG. 1, a block diagram of a system for enhanced dining experiences using a mobile device according to one embodiment is provided. System 100 includes workstation 110, which may be any suitable computer, including for example, desktop computers, laptop computers, notebook computers, etc.

System 100 may further include mobile electronic device 120. In one embodiment, mobile electronic device 120 may be a smartphone (e.g., Apple iPhone, Samsung Galaxy, Droid, etc.), a tablet computer (e.g., Apple iPad, Samsung Galaxy, Amazon Kindle, Barnes & Noble Nook Tablet, etc.), Google Glass, Smart E-watch/Bracelet, etc. In general, any suitable mobile electronic device may be used in implementation of the systems and methods of the invention as described herein. Preferable, mobile electronic device 120 may access a network, such as the Internet, wirelessly.

In one embodiment, system 100 may include terminal 130. Terminal 130 may be provided, for example, at kiosks in hotels, malls, airports, etc.

System 100 may include server 150. In one embodiment, server 150 may host an application or system that may be used to enhance the user's dining experience. As shown in FIG. 1, such a system is characterized as an RS (restaurant system) 151. Although only one server and one system is depicted in FIG. 1, more than one server and/or more than one system may be provided.

Places of interest, such as restaurants 160, may be provided. Each restaurant or other place of interest may include a local computer system dedicated to that particular place of interest. Such local computer system is characterized in FIG. 1 as an LRS (local restaurant system) 161.

The system 100 further includes a database 180. The database 180 may receive, store and/or maintain user information, account information, user preferences, data on the places of interest, payment information, rewards information, loyalty account information, etc. further details of the database 180 are described below with reference to FIGS. 17-19. The further details include customer (user) data and restaurant data—and particulars thereof.

Workstation 110, mobile electronic device 120, terminal 130, restaurants 160, and database 180 may communicate with server 150 over any suitable network. Suitable networks include, for example, the Internet, a local area network (LAN), a wide area network, a virtual private network, etc. In one embodiment, workstation 110 and mobile electronic device 120 and/or terminal 130 may communicate with each other using any suitable communication protocol, including WiFi, Bluetooth, Near Field Communication (NFC), etc.

Referring to FIG. 2, a method for enhanced dining experiences using a mobile device according to one embodiment is provided. In step 210, a user may access an application to obtain information regarding a place of interest, such as a restaurant. In one embodiment, the user may access a mobile application using a mobile device. In another embodiment, a user may access a program, internet site, etc. using a desktop computer, laptop computer, terminal, kiosk, or other suitable device. In another embodiment, the user may contact the place of interest by telephone, email, text message, facsimile, etc.

In step 220, if the user has more than one place of interest to choose among, the user may select a place of interest. For example, if, in step 210, the user searched for "Italian restaurants," or retrieved a list of his or her favorite restaurants, the user may select one of the restaurants to patronize.

In step 230, the user may indicate specifics for a reservation including that "no-swipe" will be used for the event. In one embodiment, the user may provide details, including the size of the party, names and/or pictures of those in the party, a requested reservation time, any special requests (e.g., identification of any food allergies, special seating requests, any events that are being celebrated, etc.), etc. In one embodiment, the user may pre-order food, such as food for children, food that may be prepared in limited quantities (e.g., chef's specials), food that may require additional preparation time (e.g., souffles), etc.

In one embodiment, the user may pre-authorize a gratuity. In one embodiment, the user may have the option to change the gratuity at a later time.

An exemplary screenshot of a user interface is provided in FIG. 3A.

Referring again to FIG. 2, in step 240, the restaurant may receive the user's reservation or other information indicating that the user will be dining at the restaurant, and the user's request (or notification) that the user will be using no-swipe. In another embodiment, the user may simply arrive, without reservation, and inform the host/hostess that he or she will be using no-swipe. In still another embodiment, the user may provide payment information to a terminal, point of sale device, or other payment device before, or at any time during, the dining experience.

In step 250, the user completes his or her dining experience and departs the restaurant without receiving the check.

In step 260, the restaurant may inform the issuer, host, facilitator, etc. of the selected no-swipe payment mechanism of the amount of the check and present gratuity options for the user (e.g., amounts based on 10%, 12%, 15%, 18%, 20%, etc.). In another embodiment, the restaurant may communicate directly with the user using, for example, a mobile application on the user's mobile device, email, text message, an Internet webpage, etc. to inform the user of the check and gratuity options. In one embodiment, the user may also be presented with an option to select a different payment mechanism.

Figure 3B:
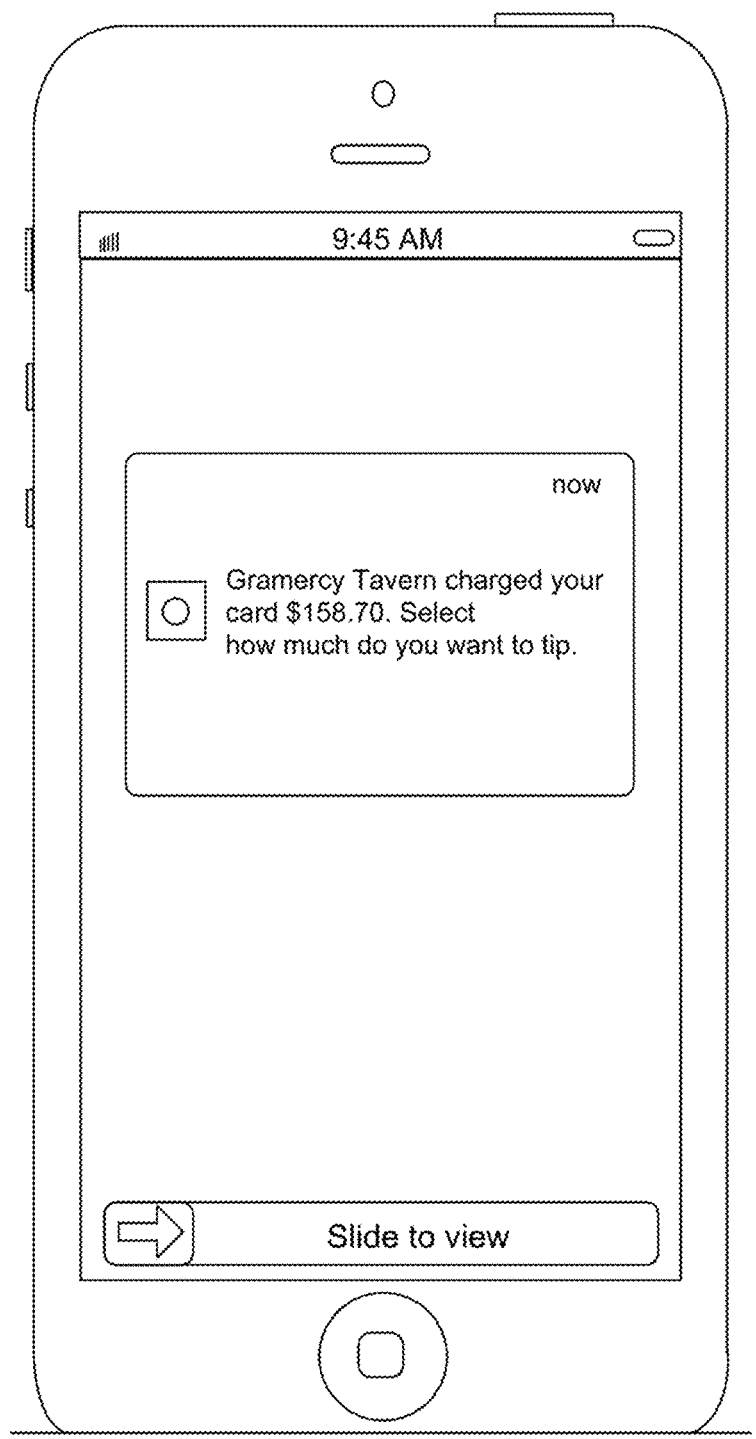

An exemplary screenshot of a message to the user is provided in FIG. 3B. Referring again to FIG. 2, in step 270, the user may authorize payment, including a gratuity amount. In one embodiment, the user may use the mobile application to authorize payment to the restaurant. In another embodiment, the user may reply to a text message. In still another embodiment, the user may provide authorization to a website.

Figure 3C:
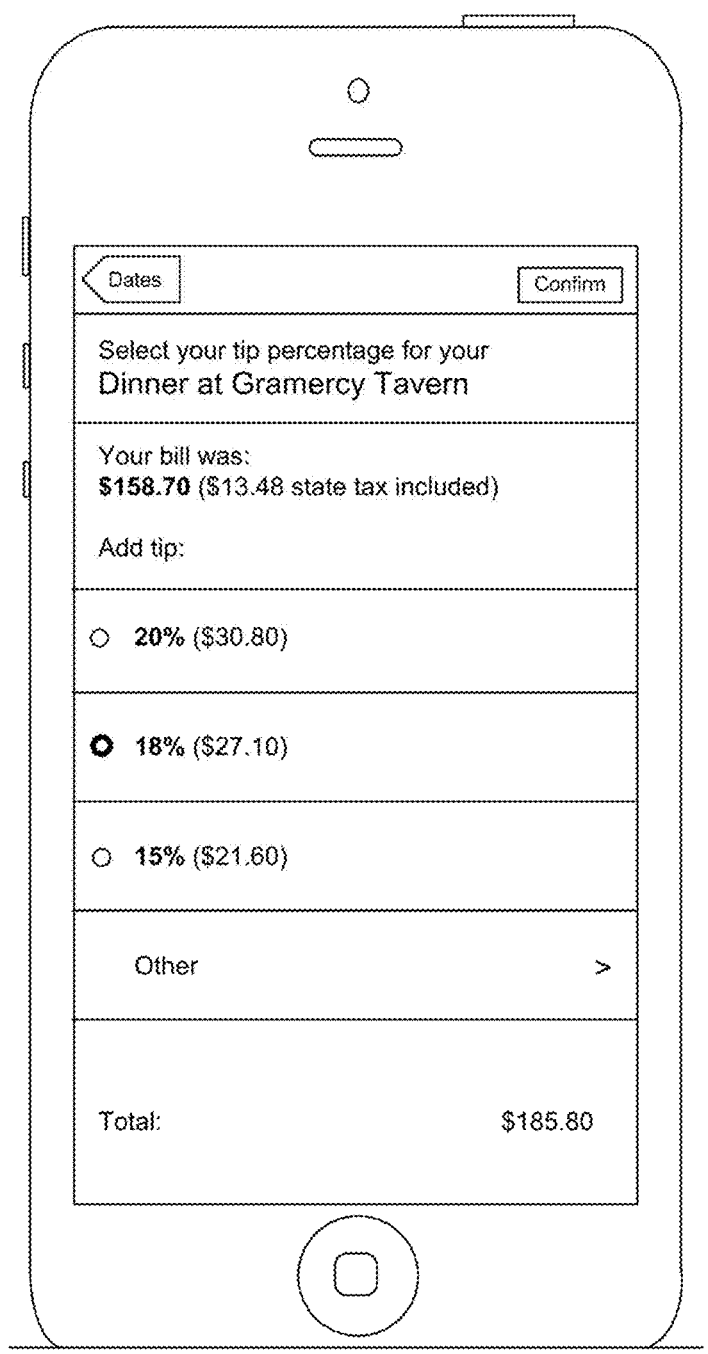

An exemplary screenshot of a user interface is shown in FIG. 3C.

In one embodiment, the user may be informed if he or she has sufficient rewards points to pay for some, or all, of the check. The user may also be informed if there is a better payment option (e.g., a credit card that will offer more rewards than the selected no-swipe payment mechanism) that may be preferable.

Figure 3D:

An exemplary screenshot of a message to the user is provided in FIG. 3D.

Referring again to FIG. 2, in step 280, after the payment is complete, the user may be provided with an electronic receipt by email, fax, text message, or as part of the mobile application, website, software application, etc. In one embodiment, the user may be mailed a copy of the receipt.

Figure 3E:
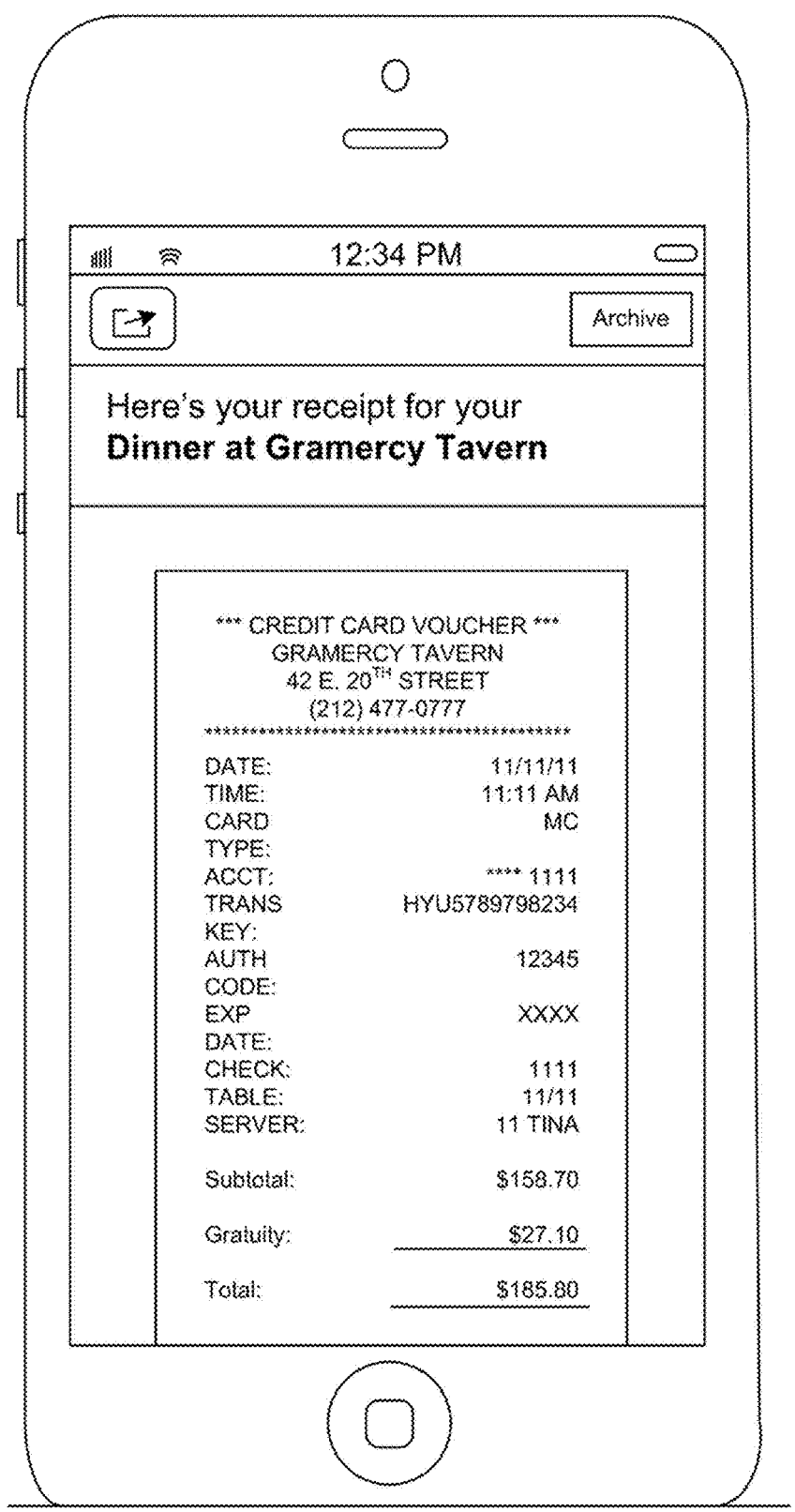

A screenshot of an exemplary message provided to the user is shown in FIG. 3E.

Referring again to FIG. 2, in step 290, the user may provide a review of the dining experience. In one embodiment, the user may save the restaurant as one of his or her favorite restaurants; may indicate that the meal was a "best meal" as discussed below; may share the review with others by social media; may share the review with others in a similar group (e.g., credit card cardholder having a certain card or status), etc.

In one embodiment, the user may further indicate if there are any parts of the check that are disputed (e.g., improper charges, etc.). In one embodiment, the user may be connected with a representative of the restaurant to resolve the dispute before the charge is authorized. For example, the user may identify any item(s) on the check that the user may dispute, and may provide a message, such as a standard message (e.g., "I did not order this item," "This item was substandard," "This item never came," etc.), by entering a description of why the item is being disputed, by being directly connected (e.g., voice, text, video, etc.) to the restaurant, by being directly connected (e.g., voice, text, video, etc.) to a customer service representative that may handle the dispute, etc.

Referring to FIG. 4, a method for tracking favorite places of interest, such as restaurants, according to one embodiment is provided. In step 410, the user may access a mobile application and search for a restaurant that was recently recommended to him or her. In another embodiment, the user may access a mobile application that may provide a restaurant of the day, a curated restaurant lists, personalized recommendations for the user, etc.

In one embodiment, the user may search for the recommended restaurant and, in step 420, the mobile application may return information on the restaurant.

Figure 5A:
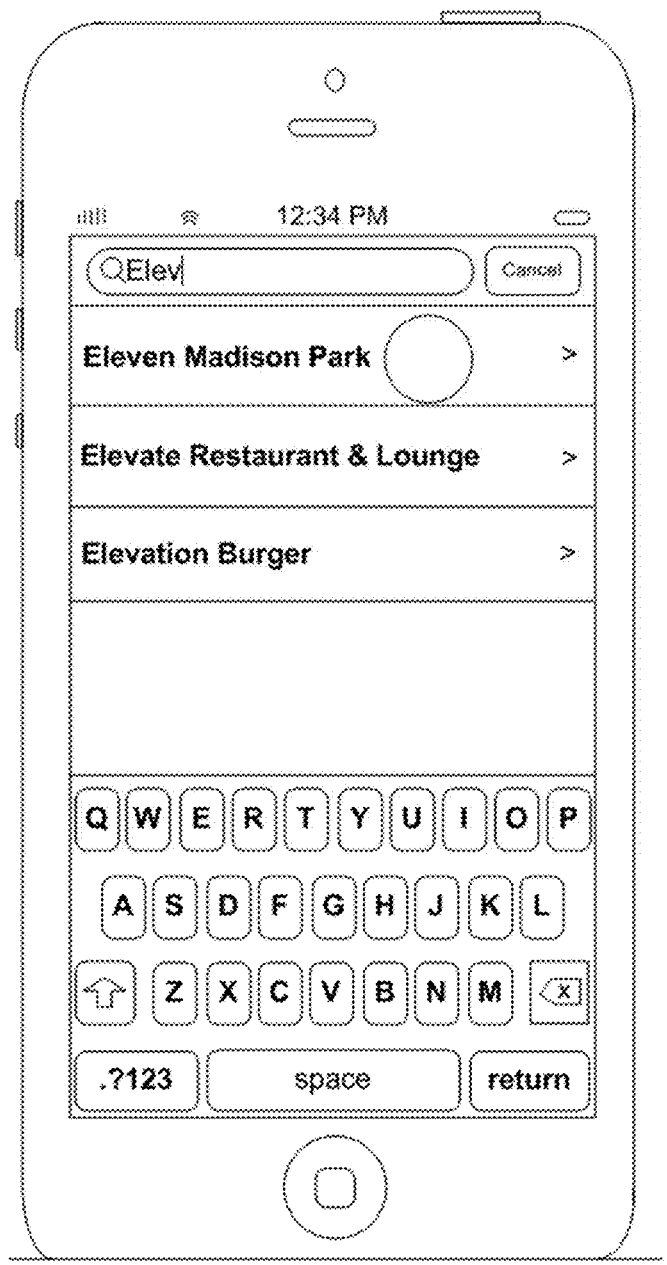
FIGS. 5A-5K depict exemplary screenshots of messages and user interfaces according to embodiments.

An exemplary screenshot of a user interface is provided in FIG. 5A.

Referring again to FIG. 4, in step 430, if the user wishes to dine at the restaurant, the user may add it to a "bucket list" of restaurants that the user wants to visit.

In step 440, the user may return to the "bucket list" of restaurants, and select a restaurant to visit.

Figure 5B:
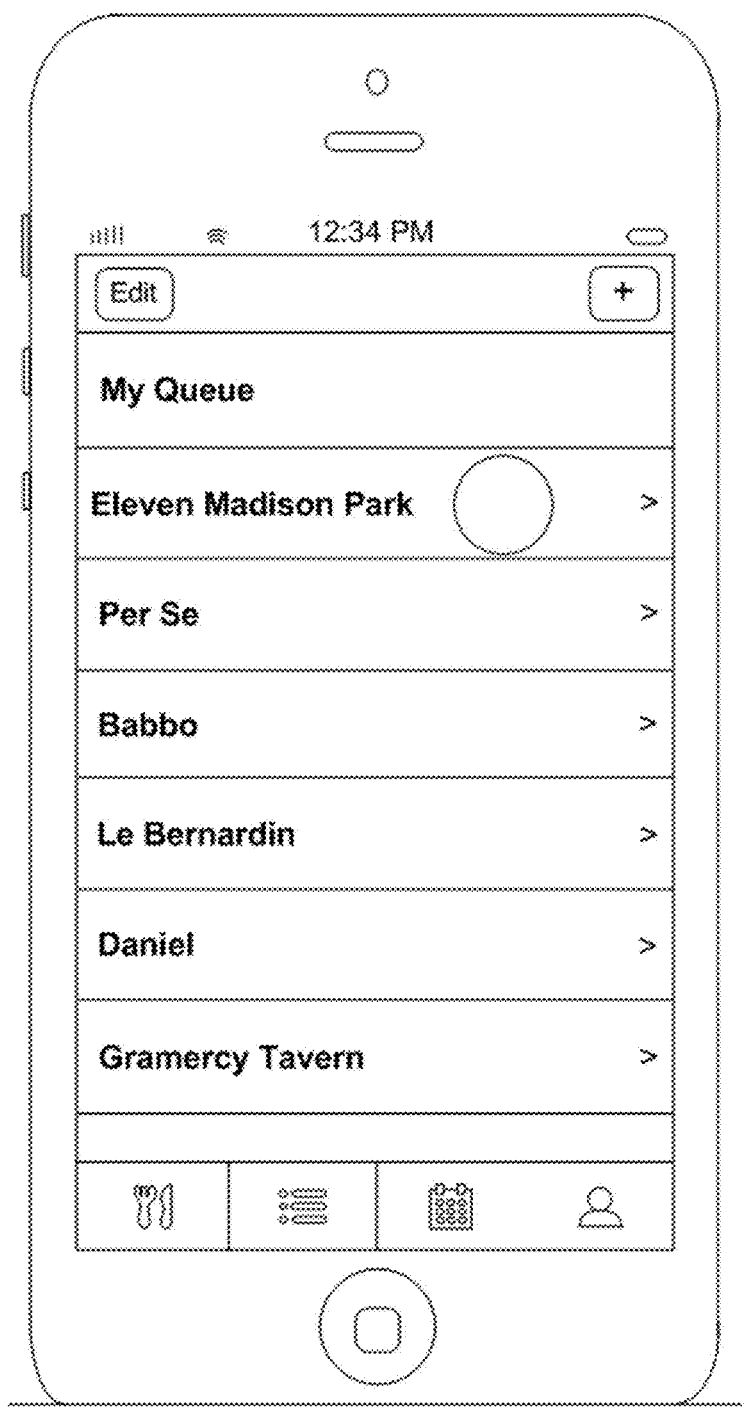

An exemplary screenshot of a user interface is provided in FIG. 5B.

Referring again to FIG. 4, in step 450, the mobile application may access a reservation service to retrieve availability. In one embodiment, the mobile application may contact the restaurant directly. In another embodiment, the mobile application may contact a reservation service (e.g., OpenTable).

In step 460, if opening are available, the user may enter the specifics (e.g., date, time, number in the party, etc.) and, if available, the reservation is made.

If a reservation is not available, in step 470, the user is may request to be alerted when a reservation is available.

Figure 5C:
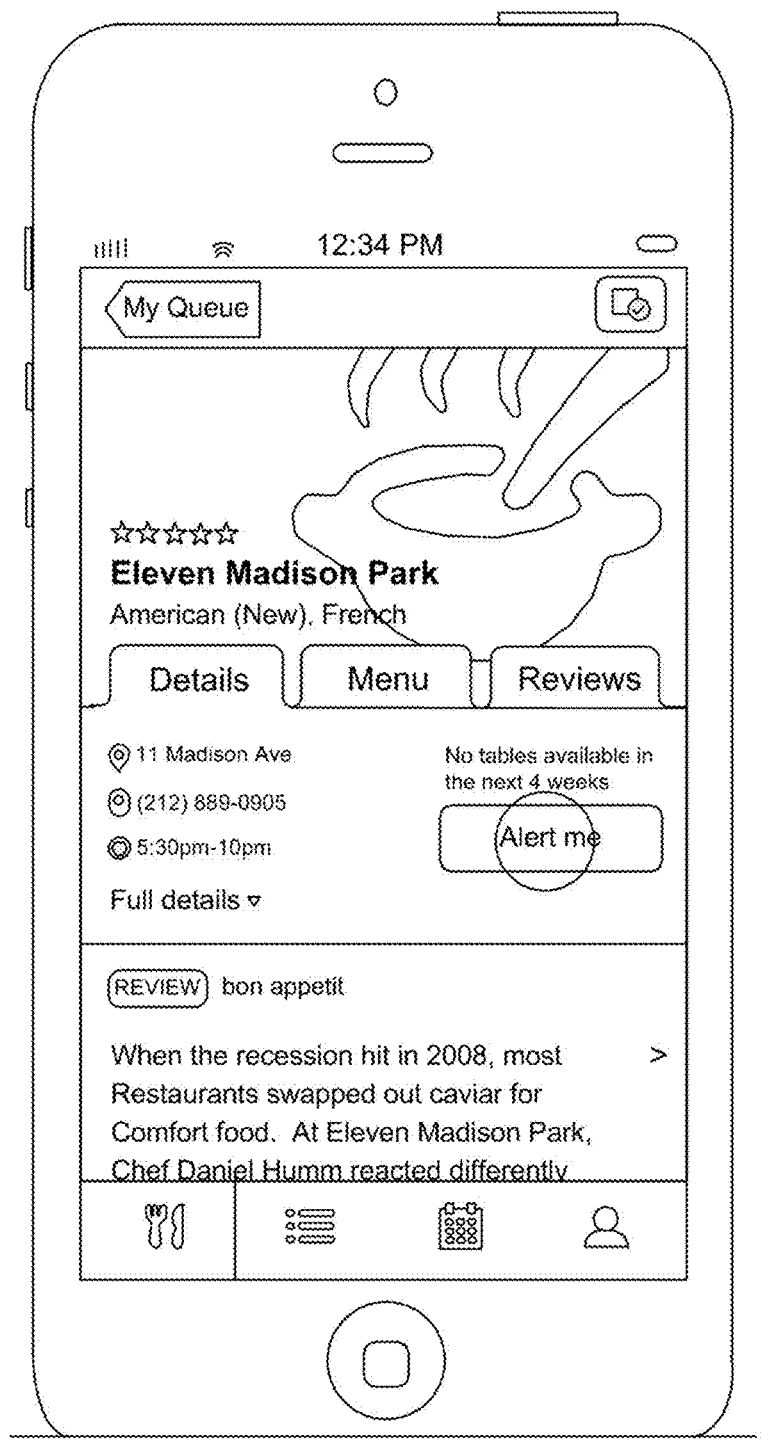

An exemplary screenshot of a user interface is provided in FIG. 5C.

In one embodiment, the user may enter specifics for the reservation, for example, whether the user would like to restrict the alerts to a specific day (or days) of the week, the meal (e.g., lunch, dinner), the number of persons in the party, whether children will attend, and whether the user would like to use points to advance in the queue.

In one embodiment, the restaurant and the sponsor of the mobile application may have a relationship that may allow customers to advance in line based on cardholder status, the use of points, etc. In one embodiment, the relationship may also involve the restaurant giving first refusal to the sponsor of any cancelations.

Figure 5D:
Figure 5E:
Figure 5F:
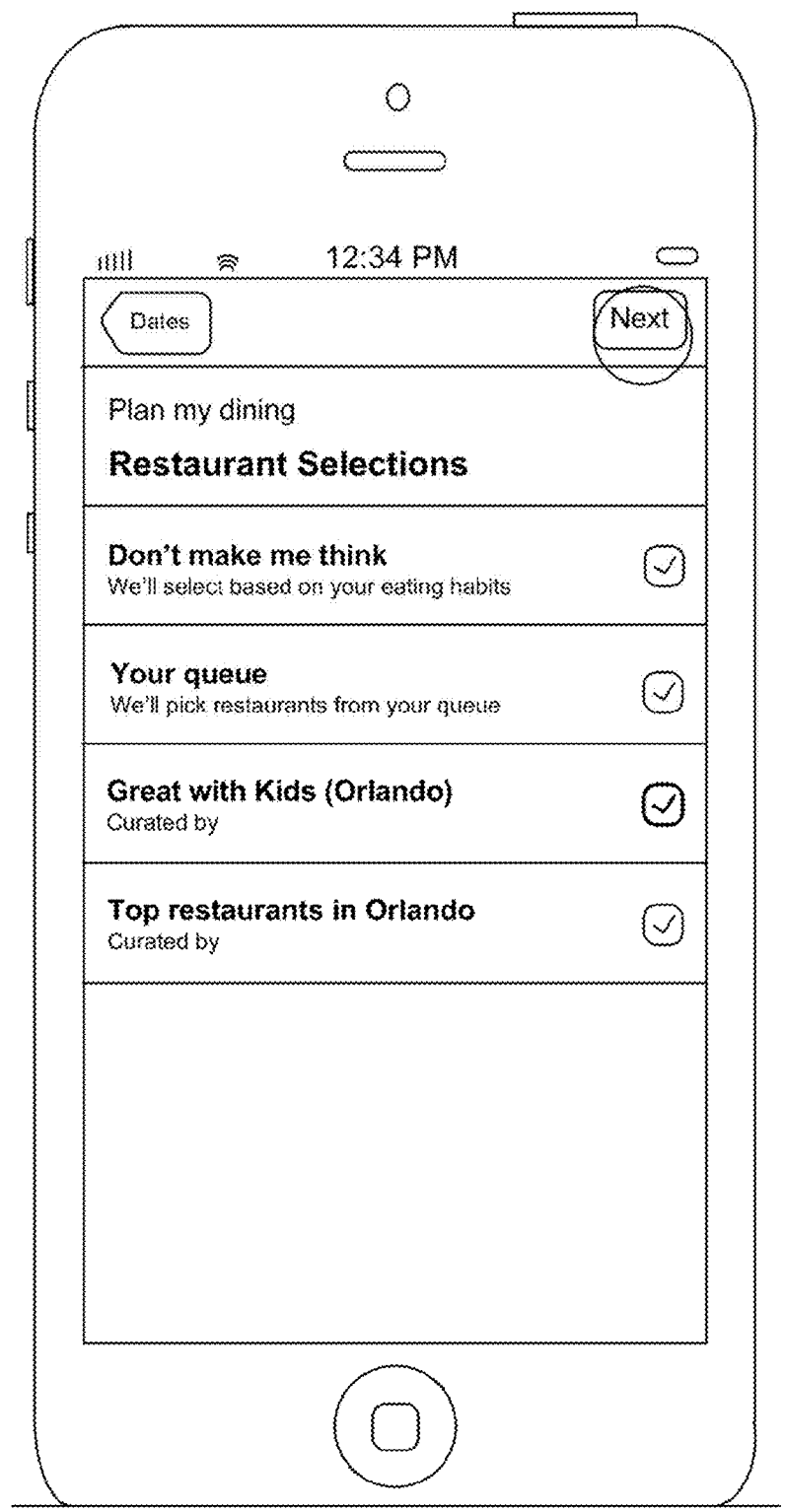
Figure 5G:
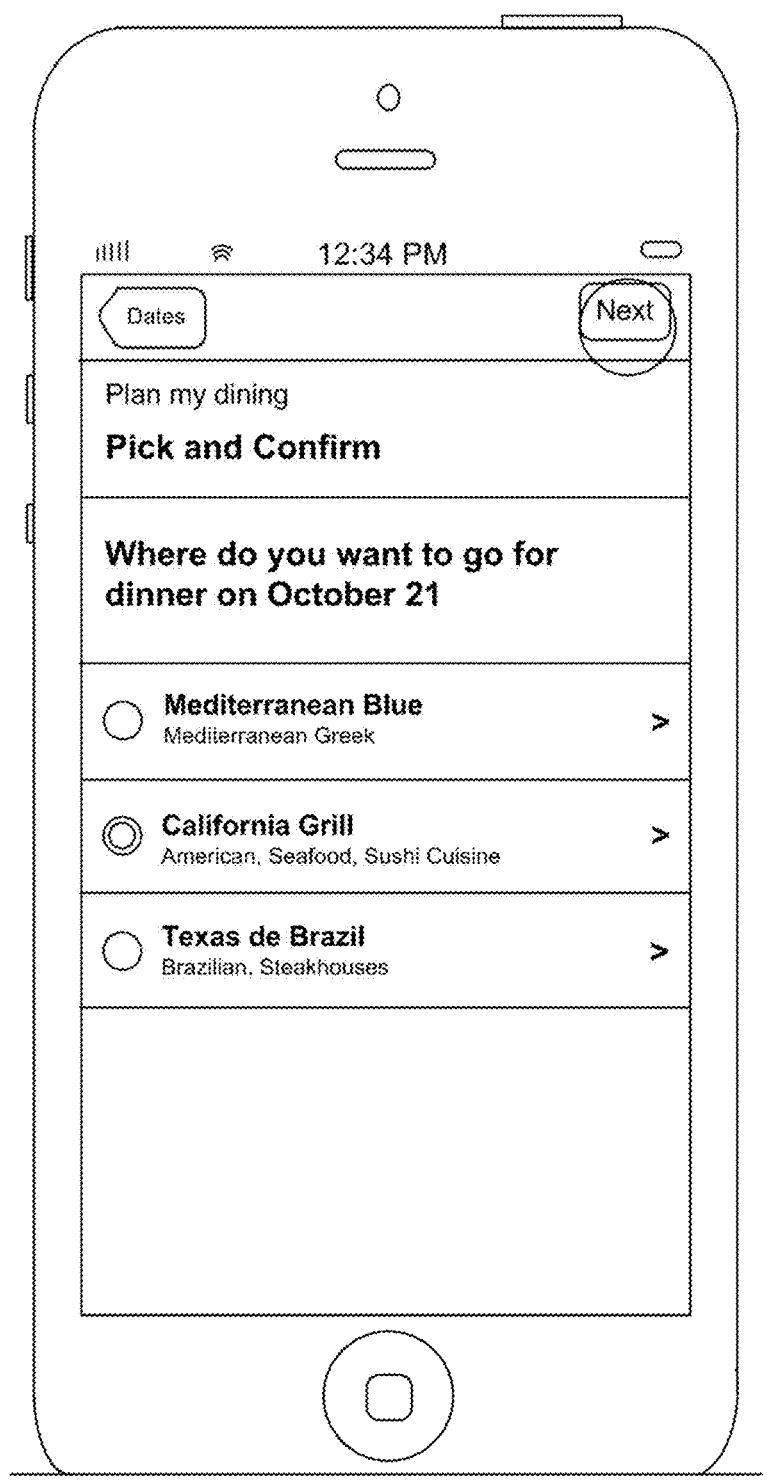
Figure 5H:
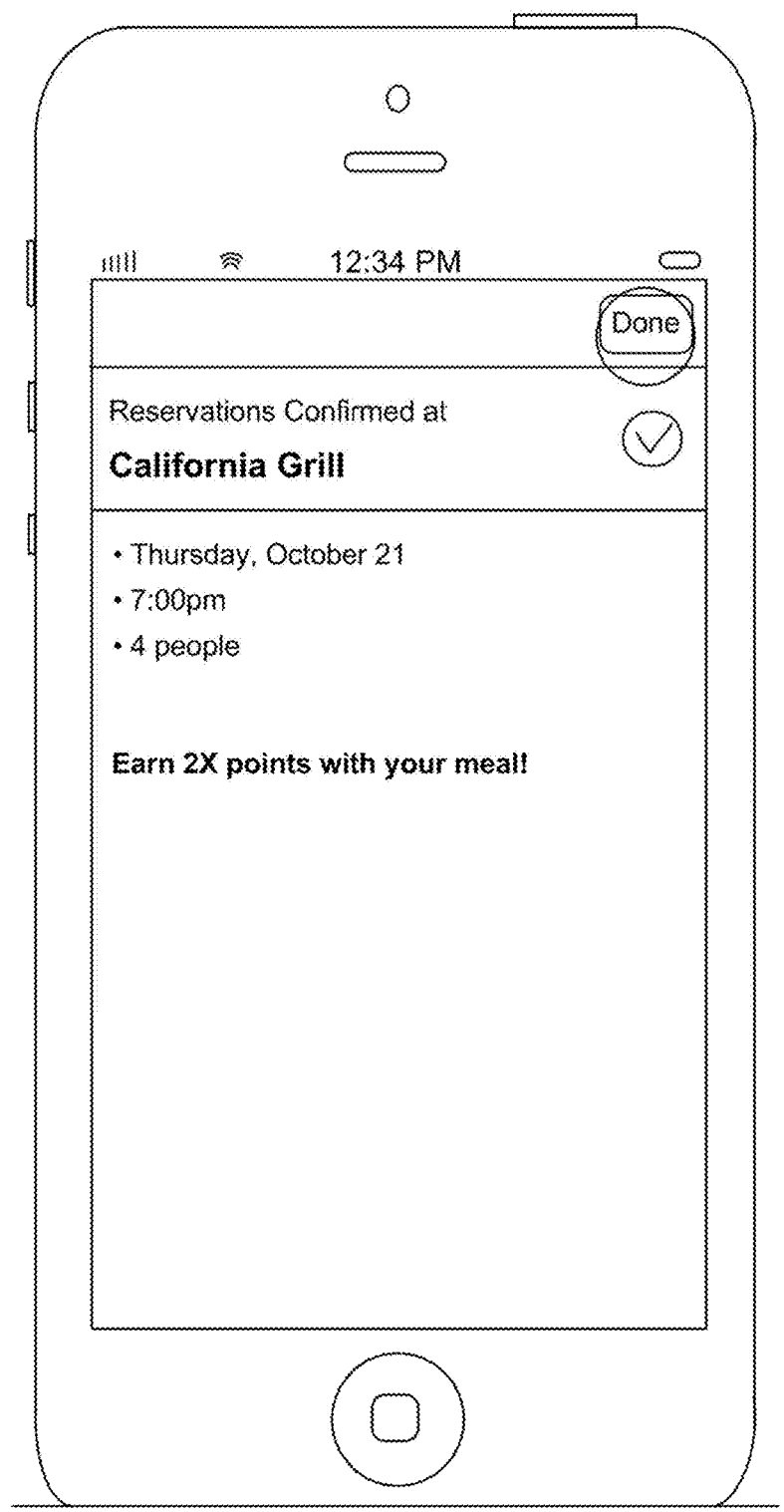

A screenshot of an exemplary user interface is shown in FIG. 5D.

In another embodiment, rather than focus on an individual restaurant, the user may enter a date/time for a restaurant. For example, the user may identify a location (e.g., city, state, neighborhood, etc.), the desired meal, the number of persons on the party, whether kids will be involved, etc. The mobile application may return a list of restaurants that meet that criteria provided that have availability for the entered criteria.

Exemplary screenshots of user interfaces are provided in FIGS. 5E-5H.

Referring again to FIG. 4, in step 480, the mobile application periodically checks for any openings in accordance with the specifics entered by the user. In one embodiment, the mobile application may contact the restaurant, reservation services, etc. periodically to check on a reservation. In another embodiment, the mobile application may place the request on a waitlist. In one embodiment, the mobile application may be able to interface directly with the restaurant's reservation system to determine availability, wait times, etc. In another embodiment, the restaurant may inform the mobile application sponsor of cancellation, may hold special tables, may hold a certain number of tables, etc. When a reservation is available, the mobile application may alert the user as to the opening.

Figure 5I:
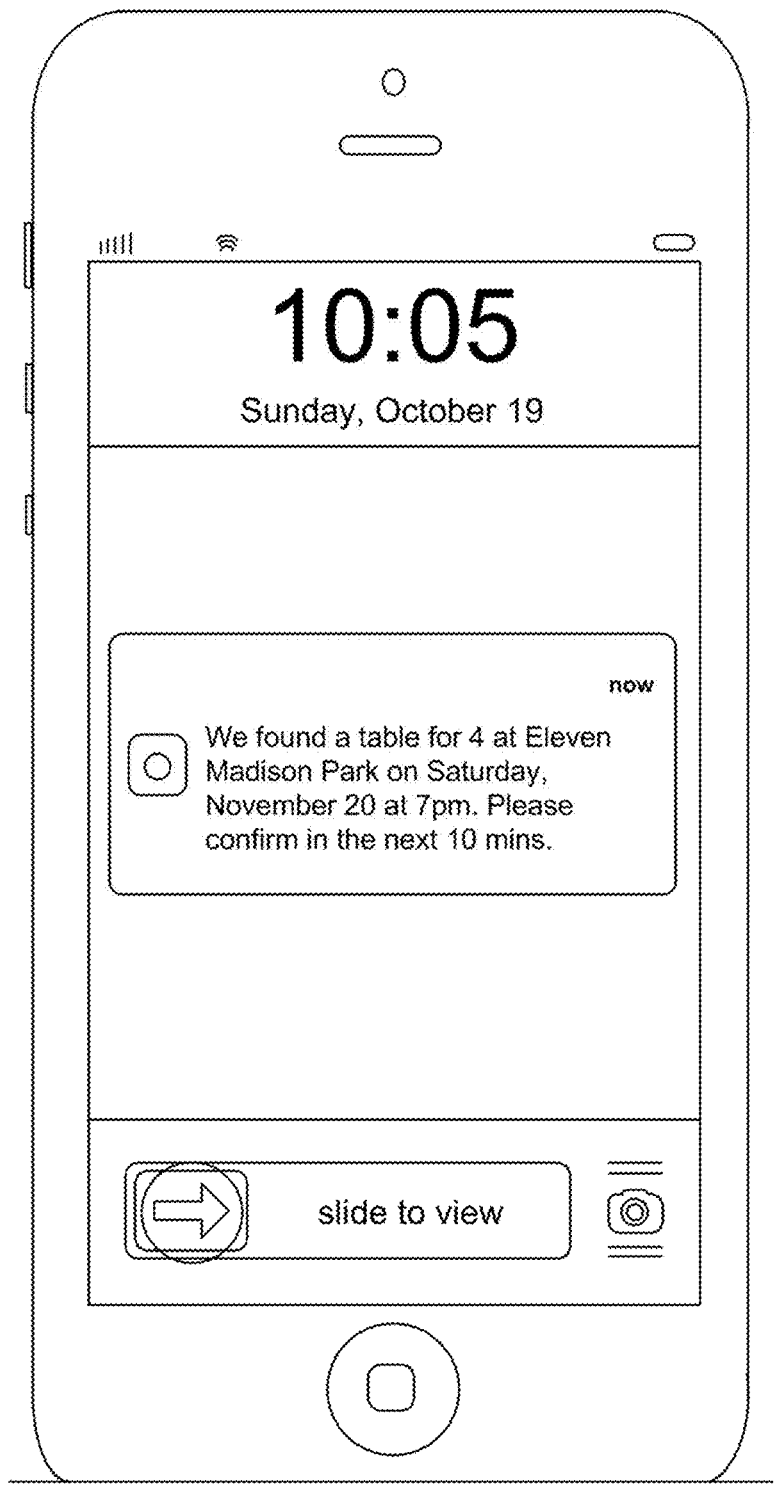

An exemplary screenshot of a user interface is provided in FIG. 5I.

Referring again to FIG. 4, in step 490, the user may confirm the reservation, or may pass on the reservation. The user may either cancel the search entirely, or may request that the mobile application continue to search for another opening.

Figure 5J:
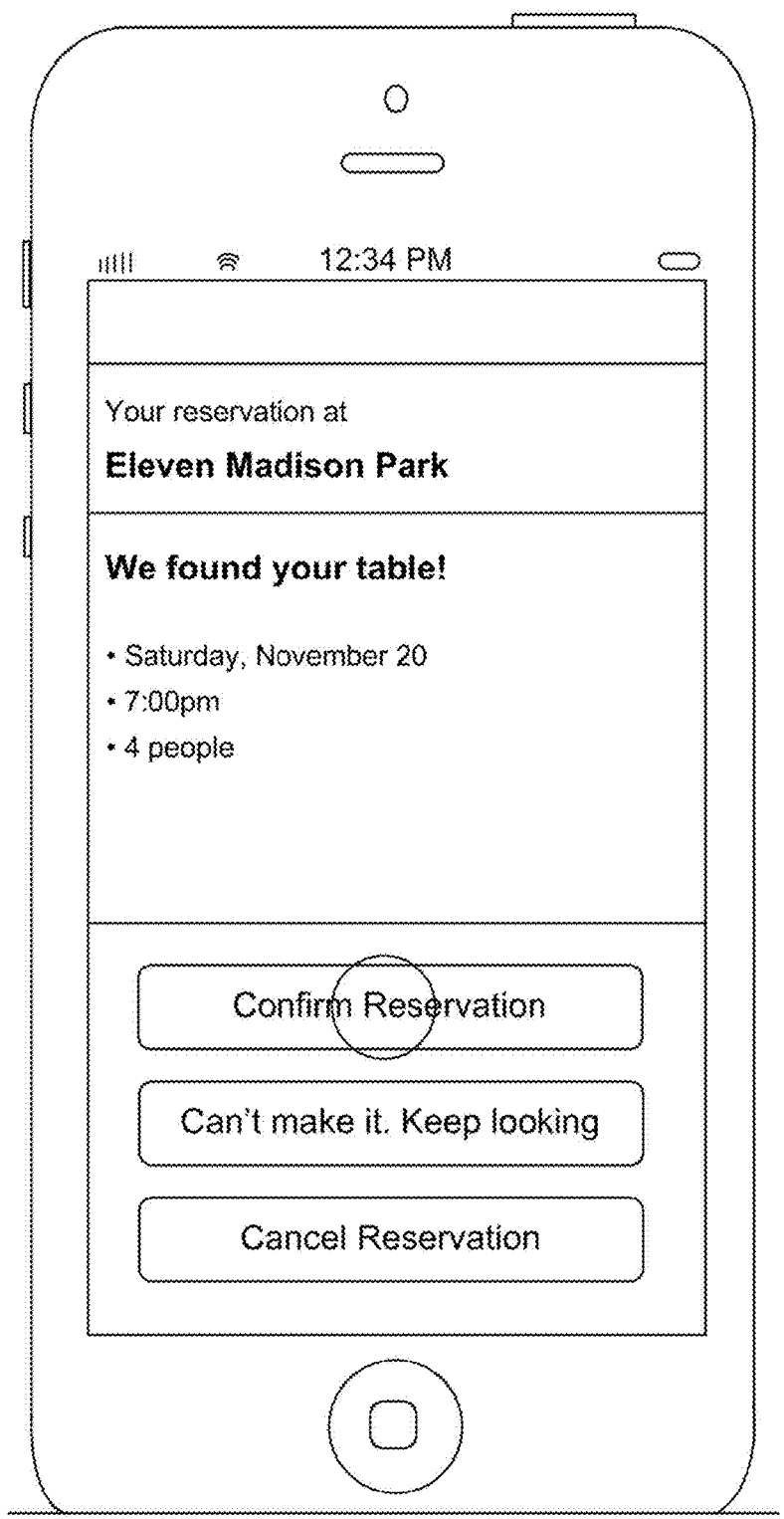
Figure 5K:
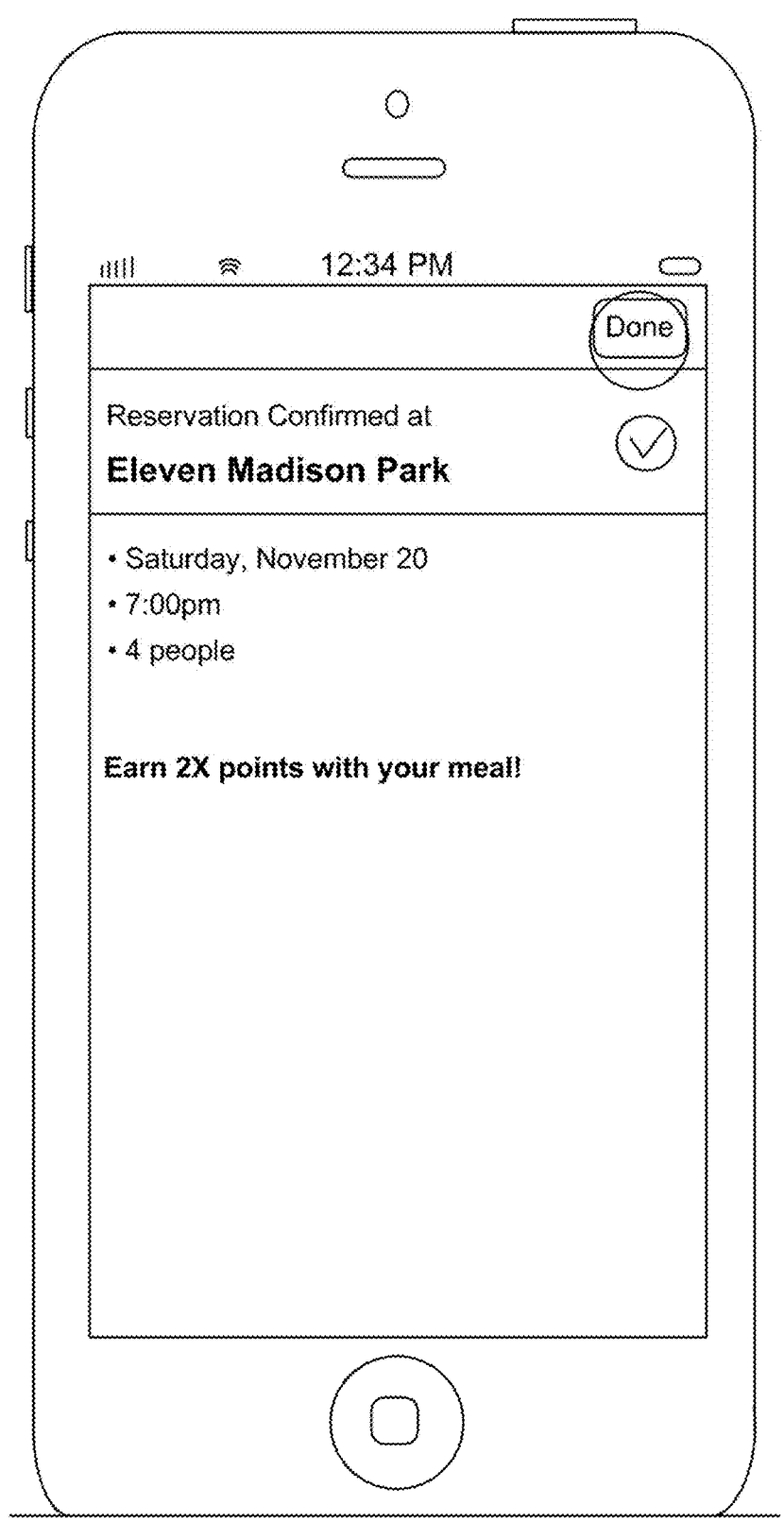

Exemplary screenshots of user interfaces are provided in FIGS. 5J and 5K.

Figure 6:
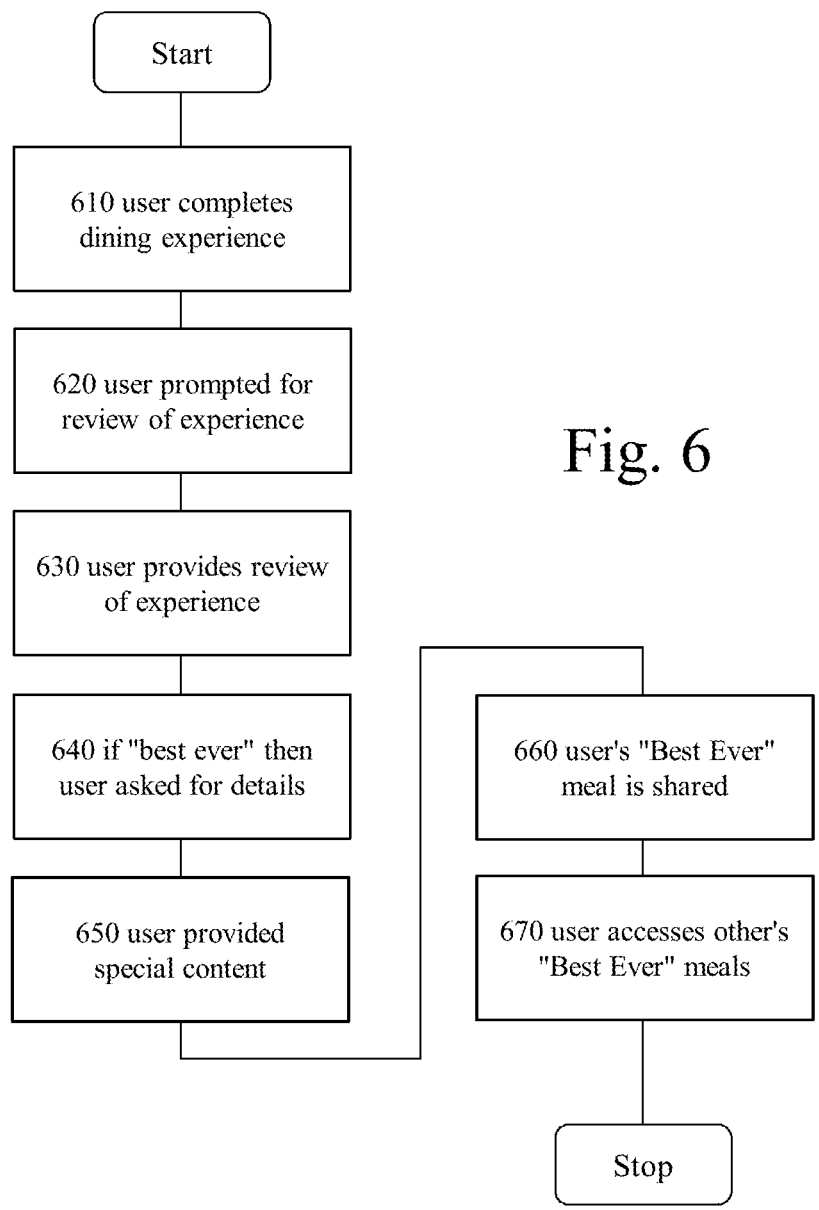
FIG. 6 depicts a method for reviewing goods and services provided by a place of interest according to one embodiment.

Referring to FIG. 6, a method for reviewing goods and services provided by a place of interest, such as a restaurant, according to one embodiment is provided. In step 610, the user may access complete a dining experience, and, in step 620, the user may receive a message asking for a review of the dining experience.

Figure 7A:
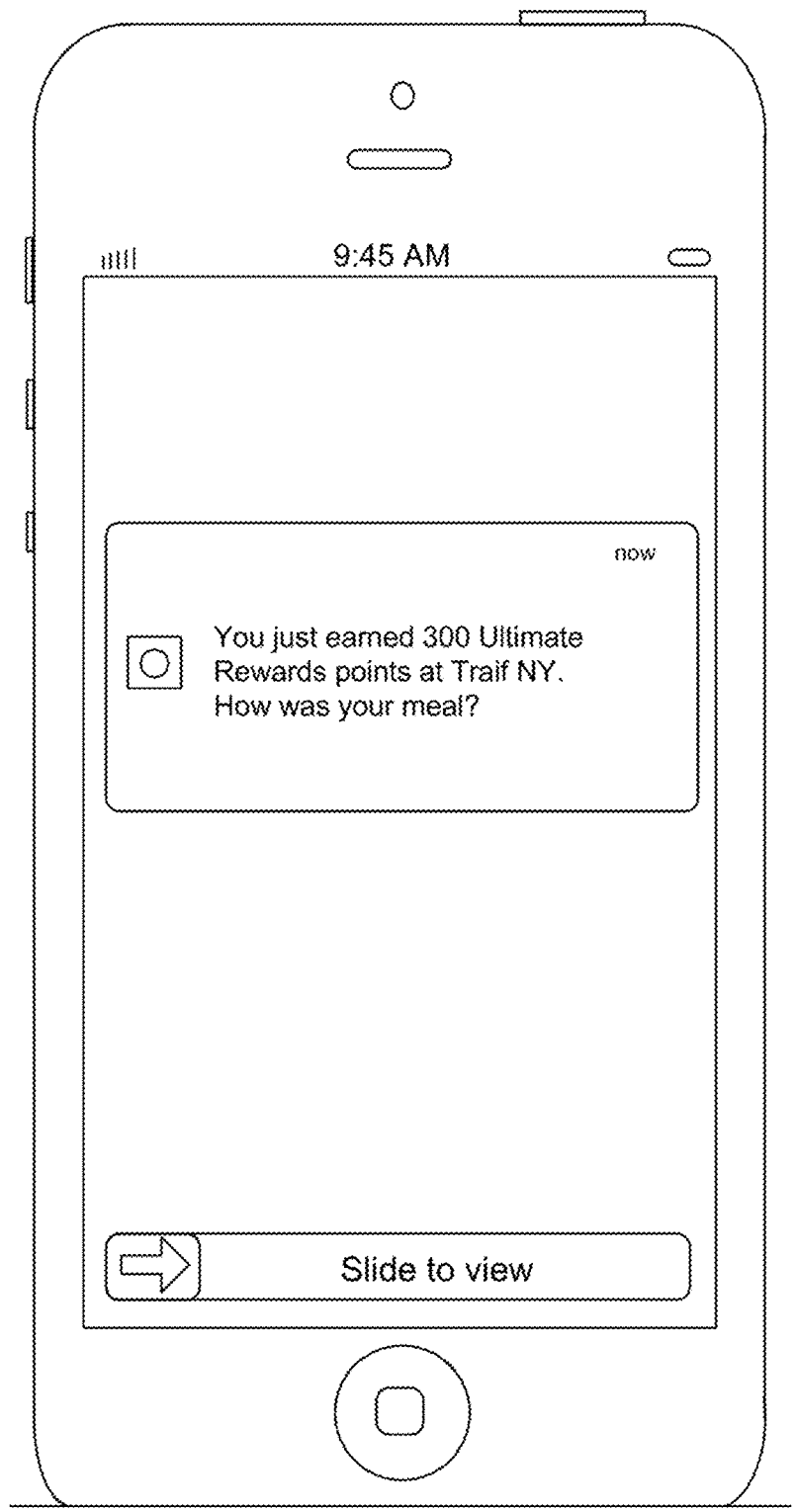
FIGS. 7A-7E depict exemplary screenshots of messages and user interfaces according to embodiments.

An exemplary screenshot of a message to the user is provided in FIG. 7A.

Referring again to FIG. 6, in step 630, the user may provide a review. In one embodiment, the user may rate the meal as "Best meal ever," "I liked it. I'd come back," "Not coming back," etc. Other ratings may be used as necessary and/or desired. For example, a grade system, scale, or any other suitable rating system may be used.

Figure 7B:

An exemplary screenshot of a user interface is provided in FIG. 7B.

Referring again to FIG. 6, in step 640, if the user selected "Best ever meal," the user may be asked for additional details.

Figure 7C:
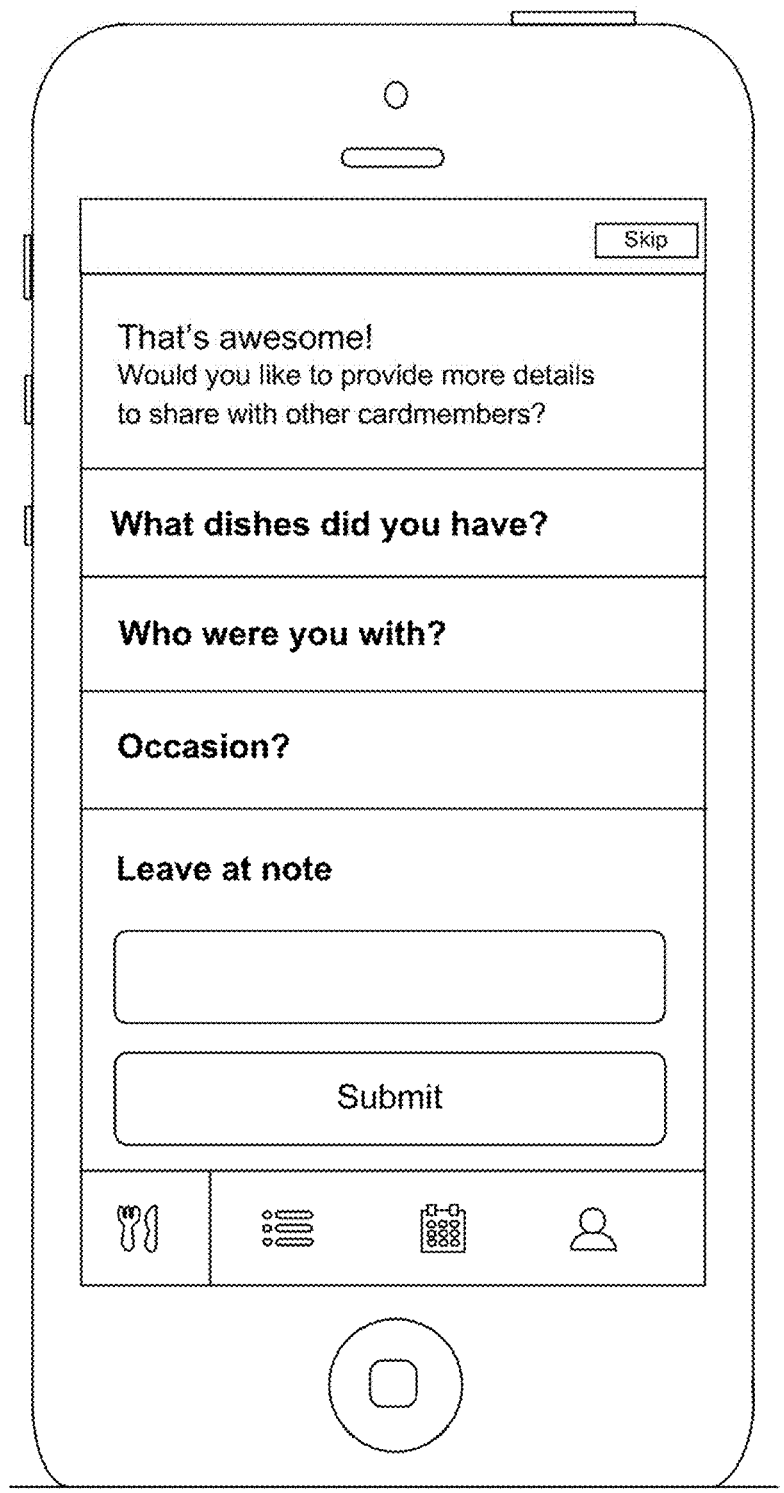

An exemplary screenshot of a user interface is provided in FIG. 7C.

Referring again to FIG. 6, in step 650, the user may be provided with special content. For example, the user may be provided with a recipe from the restaurant, a discount on a future visit, a special message from the owner/chef, etc. Any suitable special content may be provided as necessary and/or desired.

Figure 7D:
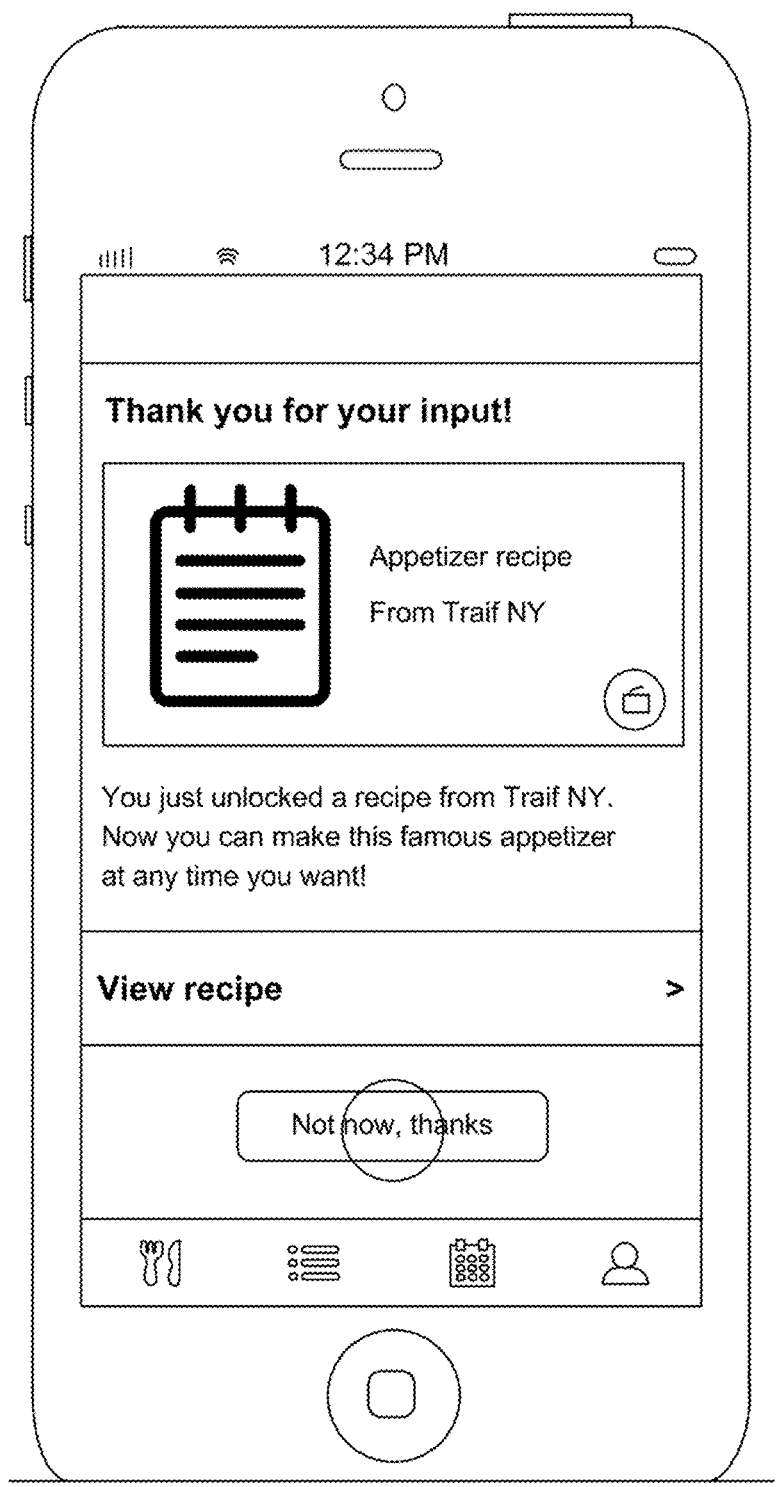

An exemplary screenshot of a user interface is provided in FIG. 7D.

Referring again to FIG. 6, in step 660, the user may share his or her "best meals ever" with a group, such as credit card holders of the same credit card.

In step 670, the user may access other's "best meals ever", and may use those recommendations to make reservations at those restaurants.

Figure 7E:
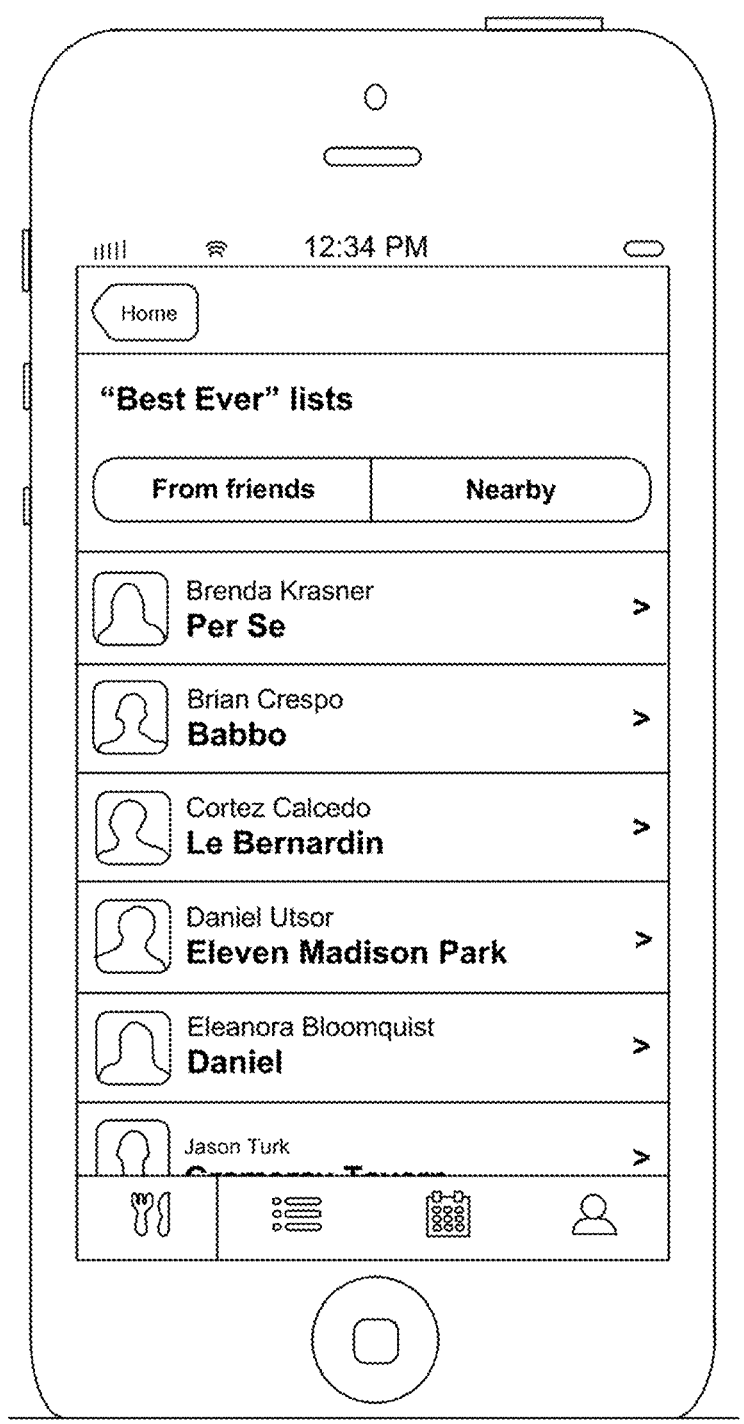

An exemplary screenshot of a user interface is provided in FIG. 7E.

Hereinafter, various further features of the systems and methods of invention will described. The "no-swipe" payment as described herein includes innovative processing in which a user, i.e. customer, participates in an event in which there is potential ongoing accrual of costs to the user, in accordance with one embodiment of the invention. The processing of the invention allows the user to not need to perform settlement at the end of the device, such as in the case of the common occurrence of a user providing his or her card to a host/hostess for settlement.

The systems and methods of the invention described below provide further features regarding "no-swipe" processing. The further features include processing to assess spend during an event on an ongoing basis. In accordance with one embodiment of the invention, upon the system observing a development at an event, the system performs processing to determine if probable spend of the customer and the event is within acceptable thresholds. For example, if the customer orders an additional food item during the course of the event, above a predetermined value, then the system performs a reassessment comparing probable spend versus acceptable thresholds.

The systems and methods of the invention described below also provide further features regarding tracking a customer's pending arrival at an event and related notifications. The additional features address a common problem in which if a customer is delayed, a restaurant or other venue may not be notified of such delay or of the disposition of the customer. The invention provides a self "check-in" with dynamic communications including offers, two-way status notifications between the RS (restaurant system) customer and/or the restaurant, for example. The invention provides processing to assess the ETA (estimated time of arrival) of the customer and perform related processing.

In further illustration of "no-swipe" processing in accordance with the invention and various related processing, FIG. 8 is a high-level flowchart in accordance with one embodiment of the invention. The processing of FIG. 8 may be performed by the RS (restaurant system) 151 and/or performed by the LRS (local restaurant system) 161. For example, the invention may utilize a central RS 151 that services a plurality of LRSs 161. On the other hand, it may be the situation that there is no LRS—and an RS solely performs the various processing described in FIG. 8.

As shown in FIG. 8, the processing starts in step 200 in which the event processing of the invention is initiated. Then, the processing passes to step 210.

In step 210, the user uses an application (e.g. and "app") or website to interface with RS 151. The processing of FIG. 8 may include and/or be performed in conjunction with account set up for the particular user, association of payment mechanisms, settings associated with payment mechanisms, event preferences, and/or various other settings associated with the processing of the invention or the customer. After step 210, processing passes to step 220.

In step 220, the user selects a restaurant through interface with the RS. For example, the selection of a restaurant might be performed through a list of restaurants that the RS supports, a search mechanism for restaurants that the RS supports, or in some other suitable manner, or as otherwise described herein. After step 220, process passes to step 240.

In step 240, the RS 151 assigns an EI code (event identifier code) that is unique for that particular user and for that particular event for the user, in accordance with one embodiment of the invention. The EI code is used as a "data anchor" as characterized herein. Accordingly, the EI code, as a data anchor, is used to associate the various data and processing associated with an event, i.e., the various data and processing may contain the EI code so as to be associated with a particular event. As reflected in FIG. 8, the EI code may in particular be associated with a particular payment mechanism and activated at a predetermined point in the processing. For example, that point in the processing might be the beginning of the event or during the event, such as upon the user being approved for "no-swipe" processing. After step 240, processing then passes to step 250.

In step 250, the user interfaces with the RS 151 (via an app or some other suitable interface) to input specifics of the event. In accord with this embodiment of the invention, one of the specifics that the user will input regarding the event is an indication that "no-swipe" processing will be used for the event. Various details of such "no-swipe" processing are described herein. Various other specifics of the event may be input as well. For example, the user might input a particular photo that the user wishes to use for that particular event. Additionally, the user may input the particular payment method that the user wishes to use for event. For example, the particular payment method might be constituted by a particular credit card, which is associated with the EI code for the event. In accordance with one embodiment of the invention. Accordingly, the user might input the credit card number and the expiration date. Then, the processing passes to step 255.

In step 255, the restaurant venue receives the reservation from the restaurant system 151. For example, this processing might be constituted by a local computer associated uniquely with the particular restaurant interfacing with the RS 151 to receive the particulars of the reservation. Such local computer might be constituted by the LRS "local restaurant system" 161 as shown in FIG. 1. It should be appreciated that the processing and data retained by the RS versus the processing and data retained by the LRS may vary as desired. In accordance with one embodiment, the only data which the LRS receives might be constituted by the particulars of the reservation including name, contact information, date and time of the reservation. On the other hand, the LRS might be one and the same as the RS. In other words, in accordance with one embodiment of the invention, the LRS, which is uniquely associated with a particular restaurant or other venue, for example, performs the processing of the RS and thus effectively constitutes the RS. On the other hand, a single RS may service hundreds or more restaurants (LRSs), as otherwise described herein.

After step 255 of FIG. 8, the processing then passes to step 260. In step 260, time passes between the reservation and the event. Accordingly, step 260 reflects the passage of time between when the reservation is made via the customer interfacing with LRS and the event. After step 260, the processing passes to step 300. In step 300, the RS 151 processes the arrival of the user. It is appreciated that such processing of the arrival of the user might include related processing including reminders of the event being sent to the user a predetermined time(s) before the actual day of the event. Further details of the RS processing the arrival of the user are described below with reference to FIG. 9. After step 300 of FIG. 8, the processing passes to step 400.

In step 400, processing over the course of the particular event is performed by the RS. It is appreciated that such processing of the event may include various exchange of data between the RS and the LRS. In particular, as reflected in box 400', the processing of step 400 may include, on an ongoing basis during the event, the RS monitoring the event to assess the ability to pay of the customer. Further details of the processing of step 400 are described below with reference to FIG. 10. After step 400, the processing passes to step 600.

In step 600, the event is completed and the customer may be provided with an electronic receipt. Then, in step 700, the user provides a review of his or her experience with the event and/or with the "no-swipe" processing performed by the RS. Then, the processing passes to step 800.

In step 800, the restaurant system performs post-dining experience processing. Further details of the processing of step 800 are described below with reference to FIG. 21.

After step 800, the processing passes to step 900. In step 900, the processing performed by the RS is terminated. That is, the processing for that particular user and for that particular event is concluded, and accordingly such processing is terminated.

FIG. 9 is a flowchart showing RS processing performed in conjunction with the arrival of the user (showing details of step 300 of FIG. 8) in accordance with one embodiment of the invention. As shown, the processing starts in step 300 and passes to step 310. As characterized herein, the "arrival" of the user is characterized to include the time leading up to the event, such as the generation of reminders prior to the event.

In FIG. 9, in step 310, the RS generates a barcode for the particular event. Alternatively, a barcode may have been previously generated, such as in conjunction with the user making the reservation for the particular event. The barcode includes data relating to the user's planned dining experience. In particular, the barcode may include the EI code for the event. The barcode might be displayed on the user's phone so as to be identifiable via an electronic reader at the restaurant or other venue, for example. As reflected in box 310, the barcode may well be unique to the particular user for the particular event. However, it might also be the case that the barcode may not be unique. For example, the barcode might not be unique in a situation of a group event in which one guest is not distinguished from another guest. After step 310, the processing passes to step 320.

In FIG. 9, in step 320, the user record of the particular user drives a reminder of the user's upcoming dining experience or other even. For example, such a reminder might prompt the user to check in to the restaurant at some predetermined time prior to his or her arrival. For example, the user might be prompted to check in 90 minutes or 15 minutes before a meal. Additionally, as reflected in 320', a reminder might be set by the user, by the restaurant, or by default. Such a reminder might be set to remind the user of the event one week before the event, or one day before the event, for example. It is appreciated that the particular times as described herein, such as the timing of a reminder and/or the timing in which to take certain action may vary if desired. After step 310, the processing passes to step 320.

Step 320 reflects that at some predetermined time before the particular event, the RS performs processing to determine if the user is in the restaurant. More specifically, the RS determines if the user's device is in the restaurant. Further details of such processing to determine if the user is in the restaurant is described below with reference to FIG. 11. If it is determined in step 330 that the user is indeed in the restaurant, then the processing passes to step 350.

Figure 12:
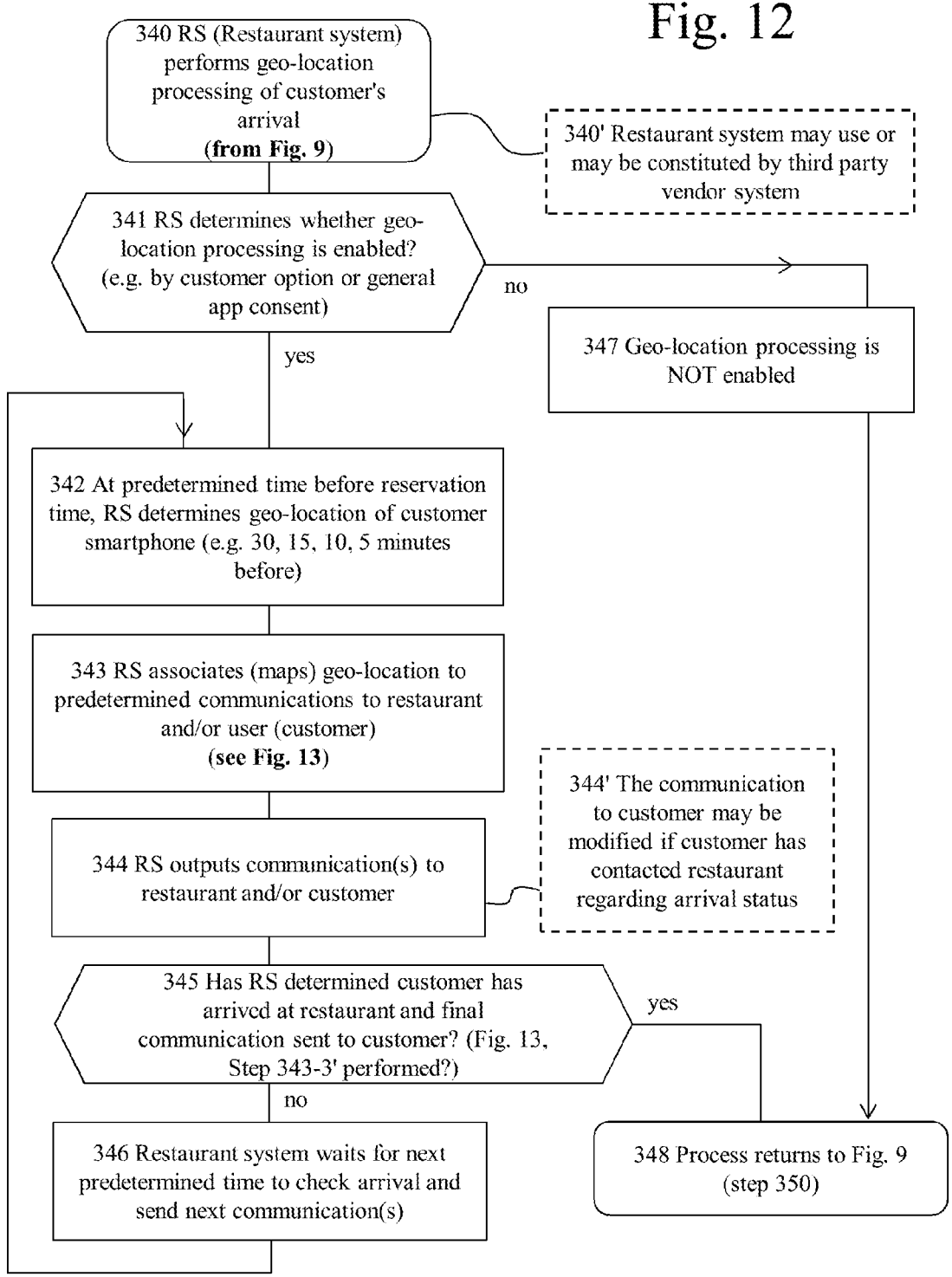
FIG. 12 is a flowchart showing the RS performing geolocation processing in conjunction with the pending arrival of the user (showing details of FIG. 9) in accordance with one embodiment of the invention.

On the other hand, if it is determined in step 330 that the user is not in the restaurant, then the processing passes to step 340. In step 340, the RS performs geolocation processing of the user's arrival. Further details of such processing are shown in FIG. 12 and described below. After step 340, the processing passes to step 350. Accordingly, the processing of step 350 reflects that the user is indeed at the restaurant. Accordingly, a suitable communication may be sent to both the user and to the restaurant. After step 350, the processing passes to step 360.

In FIG. 9, in step 360, after check in of the user, the RS activates the EI code in accordance with one embodiment of the invention. Both the restaurant and/or the customer may be alerted to the activation of the EI code via some suitable communication. For example, the restaurant persons might be alerted to activation of the EI code through a suitable terminal (e.g. computer screen interface). Such alert conveyed to the restaurant persons might include and/or be associated with an indication that the user will be using "no-swipe" dining and preferences of the user, for example. In addition, in conjunction with activation of the EI code, the payment mechanism of record is authenticated with identification of the customer and the restaurant documented. For example, a suitable customer ID and the restaurant ID may be used to document the customer and the restaurant, respectively. Indeed, it may well be the case that activation of the EI code is contingent upon a payment mechanism of record being authenticated. After the processing of step 360, the processing passes to step 370.

In step 370, after the confirmed check in, the restaurant (and/or the RS system) has the ability to send offers and/or other information to the customer. For example, such offer might be a free item, a percentage discount for costs associated with the event, and/or a buy one get one free offer. Such an offer might be presented in the form of a QR code, or other barcode, that can be automatically scanned and redeemed at restaurant. As reflected in box 370', it is appreciated that such offer or other information may also be made available in an app or via email, for example, such as via a link to customer specials.

In addition, as reflected in box 370' of FIG. 9, a particular offer and/or information that is provided to the user may be based on various information including user profile, preferences of the user, reservation history, upcoming reservations, prior meals of the user or in some way associated with the user, favorites of the user such as a favorite meal or favorite restaurant, and/or any prior offers, rewards, history or other information provided to the user.

After step 370 of FIG. 9, processing passes to step 380. In step 380, the processing returns to FIG. 8 and specifically to step 400 of FIG. 8.

Figure 10:
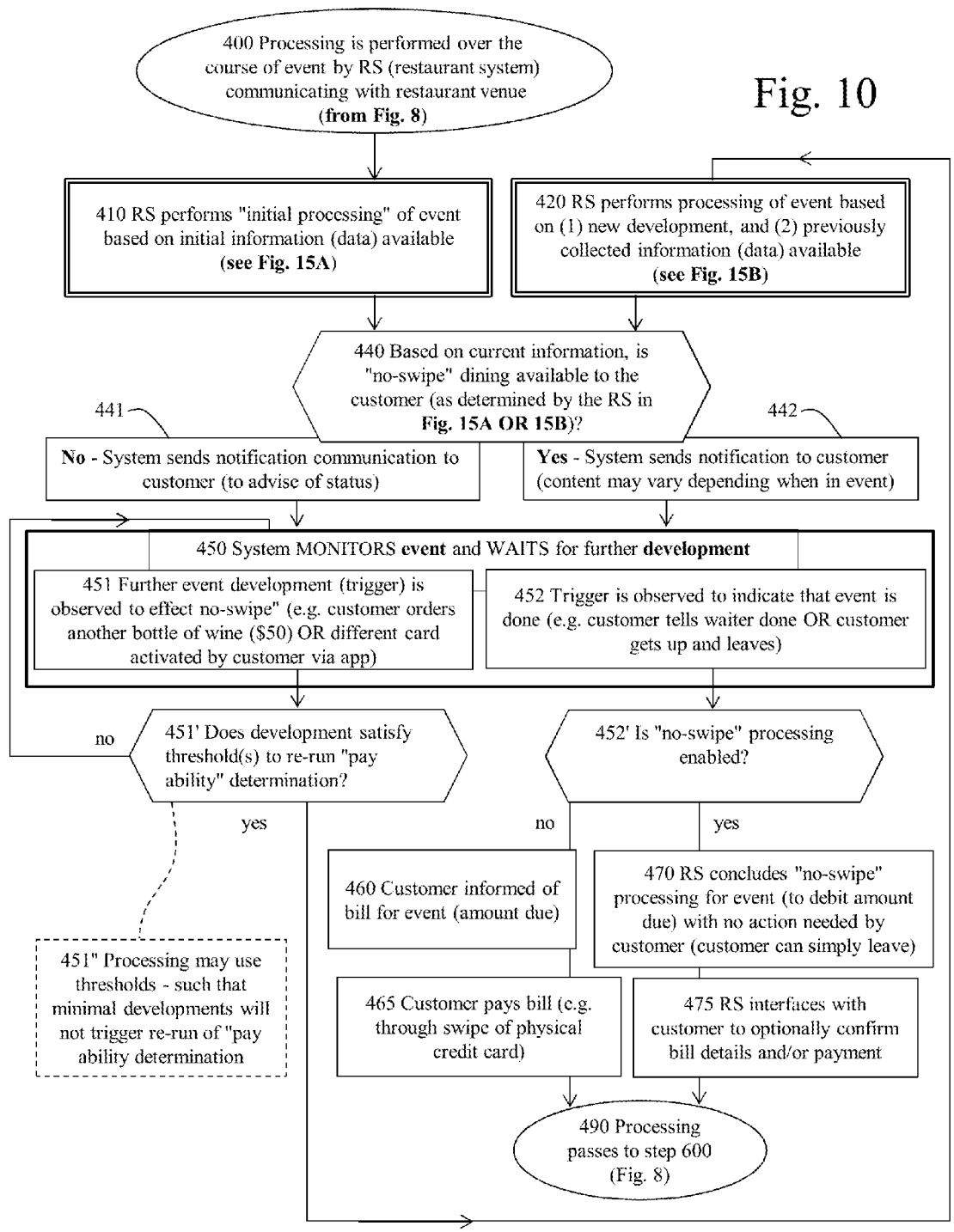
FIG. 10 is a flowchart showing RS processing performed over the course of the event by the RS communicating with the restaurant venue and the various processing that occurs over the course of the event (showing details of FIG. 8) in accordance with one embodiment of the invention.

FIG. 10 is a flowchart showing RS processing performed over the course of the event by the RS communicating with the restaurant venue and the various processing that occurs over the course of the event (showing details of step 400 of FIG. 8) in accordance with one embodiment of the invention. As shown, processing starts in step 400 of FIG. 10 and passes to step 410.

In step 410, the RS performs "initial processing" of the event based on initial information, i.e. data, that is available to the RS 151. More specifically, such initial processing relates to the customer's ability to pay for the event, which in turn factors into whether or not no-swipe dining is available to the customer.

Further details of the initial processing of step 410 are described below with reference to FIG. 15A. After step 410, the processing passes to step 440.

In step 440, the RS determines, based on the current information available to the RS, whether or not "no-swipe" dining is available to the customer. As described below, this decisioning of whether "no—swipe" dining is available is determined in the processing of FIG. 15A as well as in the processing of FIG. 15B, in accordance with one embodiment of the invention.

If in step 440 "no-swipe" dining is not available to the user, then the processing passes to step 441. In step 441, the RS sends a notification communication to the customer that no-swipe dining is not available, i.e., so as to advise the customer of such status.

On the other hand, if in step 440 it is determined that "no-swipe" dining is indeed available to the user, the processing passes to step 442. In step 442, the RS sends notification to the customer of such disposition, i.e., that no-swipe dining is indeed available to the customer. Is appreciated that the particular content of such communication might vary depending on the particular point in time over the course of the dining event.

After either of step 441 or step 442, the processing passes to step 450.

In step 450, the RS monitors the event and waits for any further development that would trigger decisioning as to whether no-swipe dining is or is not available. Accordingly, in step 451 of FIG. 10, the RS observes a further development during the event, i.e. a trigger, that affects whether no-swipe dining is or is not available. For example, in accordance with embodiments of the invention, the RS may be programmed with a rule set that dictates whether or not an event, which is observed, would trigger for the decisioning as to the availability of no-swipe dining. The RS may monitor all additional costs associated with the event as those additional costs are incurred by the customer. The rule set may dictate that if an incurred cost is above a certain dollar amount, then further processing is performed by the RS to determine whether or not no-swipe dining is available. However, various other parameters may also be monitored and compared with threshold values in a rule set—so as to determine whether further decisioning is needed regarding the availability of no-swipe dining.

Accordingly, as reflected in box 451 FIG. 10, a development may be observed in which the customer orders another bottle of wine at a cost of $50. A threshold might be set in the RS—that if an incurred cost is greater than $20, then further decisioning is performed as to the availability of no-swipe dining. Another development that might trigger such decisioning is an observed event constituted by the customer activating a different credit card or other payment account.

Accordingly, once a further development is observed by the RS system, than the processing passes from step 451 to step 451'. In step 451' the RS determines whether the development satisfies the relevant threshold or thresholds to re-run what might be characterized as an "ability to pay" determination. If "no" in step 451', then the process returns to step 450 of FIG. 10 for further monitoring of the event. For example, an event that does not trigger a rerun of the customer's ability to pay might be a minimal incurred further expense, such as an additional soda drink.

On the other hand, if "yes" in step 451' (that is the development does satisfy the thresholds to rerun an ability to pay determination) than the processing passes to step 420 of FIG. 10. In step 420, in similar nature to the processing of step 410, the RS performs processing of the event based on the newly observed development as well as previously collected information that is available to the RS. More specifically, such processing relates to the customer's ability to pay for the event, which in turn factors into whether or not no-swipe dining is available to the user. Further details of the processing of step 420 is described below with reference to FIG. 15B.

After the processing of step 420, the processing performed by the RS passes to step 440. Processing then continues as described above.

Returning now to further processing of step 450 of FIG. 10 (and the system monitoring the event and waiting for further developments) step 452 reflects the situation in which a trigger is observed to indicate that the event is done. For example, a trigger might be constituted by the customer advising the waiter that the event is concluded. Also, such a trigger might be constituted by the RS observing that the customer has left the physical venue of the event. It is appreciated that the RS might be programmed with various triggers that indicate to the system that the event has concluded. That is, the RS is provided with the data reflecting a development, and the RS performs processing to compare that input data with a rule set to determine if the data satisfies a trigger.

Accordingly, after the trigger is observed in step 452 to indicate that the event is completed, the processing then passes to step 452'. In step 452, decisioning is performed as to whether no-swipe processing is enabled.

If "no" in step 452', i.e. no-swipe processing is not enabled, then the processing performed by the RS system passes to step 460. In step 460, the user is informed of the bill for the event, i.e., the amount due for the event. Then, in step 465, the user pays the bill in some suitable manner, such as through swipe of a physical credit card. Then, processing passes to step 490. In step 490, the processing passes to step FIG. 8 and specifically step 600 of FIG. 8.

On the other hand, if "yes" in step 452' (no-swipe processing is indeed available) then the processing passes to step 470. In step 470, the RS concludes the no-swipe processing for the event, such as by debiting the amount due to the particular payment mechanism set by the customer. In such processing performed by the RS to conclude the no-swipe dining event, no action is needed by the customer. Accordingly, the systems and methods of the invention provide the ability for the customer to simply get up and leave at the conclusion of the event in which no-swipe processing is utilized.

After step 470 of FIG. 10, the processing passes to step 475. In step 475, the RS may interface with the customer to optionally confirm the bill details of the event and/or payment details of the event. For example, the processing of step 475 might include the RS sending an e-mail receipt to the customer and/or the RS outputting a receipt to a no-swipe app on the user's cell phone.

After either of step 465 or step 475 of FIG. 10, the processing passes to step 490. In step 490, the processing passes to step 600 of FIG. 8.

Figure 11:
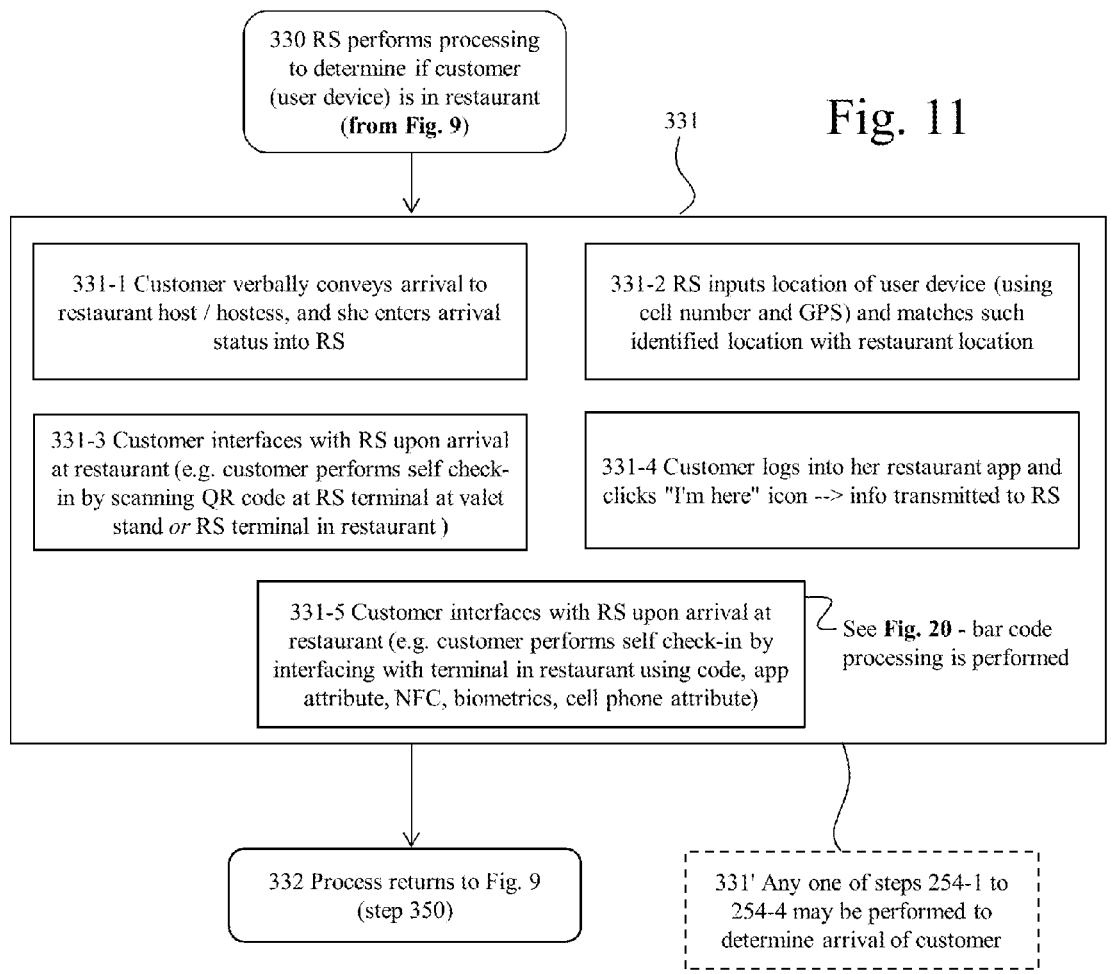
FIG. 11 is a flowchart showing RS processing performed to determine if a device associated with the user is in the restaurant or other physical venue of the particular event (showing details of FIG. 9) in accordance with one embodiment of the invention.

FIG. 11 is a flowchart showing RS processing performed to determine if the user, and more specifically a device associated with the user, is in the restaurant or other physical venue of the particular event (showing details of step 330 of FIG. 9) in accordance with one embodiment of the invention. As shown, processing starts in step 330 of FIG. 11 and passes to step 331.

In FIG. 11, step 331 includes various processing (331-1, 331-2, 331-3, 331-4, 331-5) of the RS to determine if a user device associated with the particular customer is "in" or "on" the physical venue of the event. It is appreciated any combination of the processing shown in step 331 may be performed in serial and/or in parallel as may be desired.

Step 331-1 reflects a situation that the customer verbally conveys her arrival to the restaurant host or hostess, and the restaurant host or hostess inputs such disposition of the arrival of the customer into the LRS (local restaurant system) 161. In accord with one embodiment of the invention, the LRS than outputs such information to the RS 151.

Step 331-2 reflects processing in which the RS inputs the location of a user device, associated with the user, and matches that location with the location of the restaurant, or other venue of the event. For example, the location of the user device might be determined in some suitable manner, such as determining the location of cell phone transmissions (e.g. cell phone tower location), using GPS and/or using other location technology.

Step 331-3 shows processing in which the user interfaces with the RS upon arrival at the restaurant. For example, the user might perform a self check-in by scanning a suitable QR code (or other type of barcode) at an RS terminal at a valet stand or an RS terminal in the restaurant itself. It is appreciated that rather than the user device interfacing with the RS system directly, it may well be the case that the user device interfaces with the LRS 161—and the LRS in turn interfaces with the RS 151.

Step 331-4 reflects processing in which the customer interfaces with her restaurant app to indicate that she is at the venue of the event. For example, the user might log into her RS app and click and "I'm Here" icon. Such data input by the customer (into the app on the user device) would then be transmitted to the RS.

Step 331-5 shows further processing in which the user interfaces with the RS upon arrival at the restaurant. Accordingly, such processing is related to step 331-3 of FIG. 11. However, step 321-5 is distinct in that such processing reflects the situation in which the customer utilizes some special attribute of her physique and/or her user device. For example, such attribute might include a code, and app attribute, biometrics, or other attributes of the user device, such as a cell phone.

Accordingly, the processing of step 331 in FIG. 11 provides for the RS to receive data indicating that the customer is on the physical venue for the event. After step 331, the processing passes to step 332. In step 332, the process passes to step 350 of FIG. 9. That is, the processing returns to FIG. 9.

FIG. 12 is a flowchart showing the RS performing geolocation processing in conjunction with the pending arrival of the user (showing details of step 340 of FIG. 9) in accordance with one embodiment of the invention. As shown, processing starts in step 340 of FIG. 12 and passes to step 341.

In step 341, the RS determines whether geolocation processing is enabled. Such enablement might result from a user option being selected (by the user) so as to allow tracking of the user. Alternatively, such enablement might result from a general app consent or "terms of use" for the app, for example.

If it is determined by the RS in step 341 that geolocation processing is not enabled, then the process passes to step 347. Thereafter, the processing passes to step 348 in which the process returns to FIG. 9. Specifically, the processing returns to step 350 of FIG. 9.

On the other hand, if it is determined in step 341 that geolocation processing is enabled, then the process passes from step 341 to step 342. In step 342, at a predetermined time before the reservation time, the RS determines the geolocation of the user device, such as the customer's smart phone. In other words, the RS determines processing to determine the physical location of the customer. The predetermined time may vary as desired, such as 30 minutes before the reservation time, 15 minutes before the reservation time, and/or 5 minutes before the reservation time, for example. Upon the RS determining the geolocation of the user device in step 342, the processing then passes to step 343.

In step 343, the RS associates the geolocation (observed from the customer location) to predetermined communications to the restaurant and/or the customer. In other words, in accordance with embodiments of the invention, the RS may determine how far out the customer is from the restaurant and associate (i.e. map) such observed parameter with a predetermined communication to send to the restaurant and/or a predetermined communication to send to the customer. For example, if the customer is observed to be 3 minutes from the venue, the communication sent to the user might be "Looks like you are close to your restaurant for the evening—we look forward to seeing you." Further details of the processing of step 343 are described below with reference to FIG. 13. After step 343, the processing passes to step 344.

In step 344, the RS outputs the "mapped to" communication(s) to the customer and/or the restaurant. It is appreciated further that the particular content of the communication sent to the restaurant and/or user may vary depending on a number of variables. For example, one variable might be contact between the customer and the restaurant. For example, a communication sent to a user might be modified if the user has contacted the restaurant regarding arrival status.

After step 344 of FIG. 12, the processing passes to step 345.

In step 345, decisioning is performed regarding whether the RS has determined that the user has arrived at the restaurant and a final communication sent to the user. For example, the RS determines whether step 343-3' of FIG. 13 has been performed—so as to reflect arrival of the customer.

If in step 345 the RS determines that the user has not arrived at the restaurant, then the processing passes to step 346. In step 346, restaurant system waits for the next predetermined time to check arrival of the customer and to send a communication to the customer, based on the disposition of the customer regarding the customer's arrival. Accordingly, after the processing of step 346, the processing passes back to step 342 in which the RS waits for such next predetermined time to check the disposition of the customer.

On the other hand, if it is determined in step 345 that the user has arrived at the restaurant, then the processing passes to step 348. In step 348, the processing returns to FIG. 9 and step 350.

Figure 13:
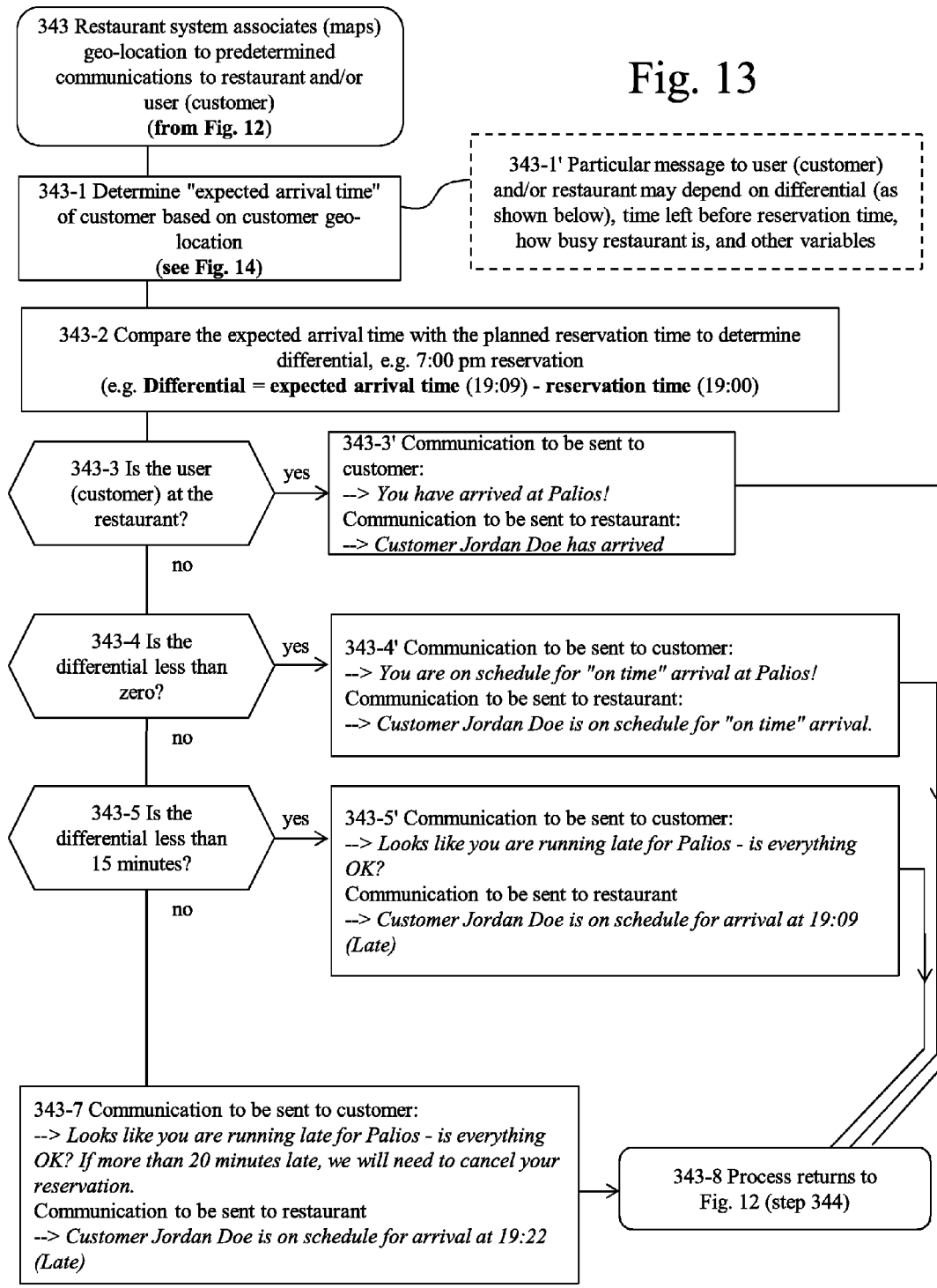
FIG. 13 is a flowchart showing the RS associates (maps) the geolocation of the customer to predetermined communications to be sent to (1) the restaurant and/or (2) the customer (showing details of FIG. 13) in accordance with one embodiment of the invention.

FIG. 13 is a flowchart showing the RS associates (maps) the geo-location of the customer to predetermined communications to be sent to (1) the restaurant and/or (2) the customer (showing details of step 343 of FIG. 13) in accordance with one embodiment of the invention. Accordingly, the processing of step 13 shows the manner in which the RS may observe a particular geolocation of the customer vis-à-vis the physical location of the venue for the event— and map such observed information into a suitable communication or communications for sending to the customer and/or restaurant. It may well be the case that a different communication is sent to the restaurant vis-à-vis the communication sent to the customer. As shown, processing starts in step 343 of FIG. 13 and passes to step 343-1.

In step 343-1, the RS determines the expected arrival time of the customer based on the customer's geolocation. Further details of such determination of the location of the user is described below with reference to FIG. 14. As reflected in box 343-1', the particular message that is sent to the customer (and/or the restaurant) may depend on the differential between the ETA (estimated time of arrival) of the customer vis-à-vis the reservation time, the time left before the reservation time, how busy the restaurant is, and/or other variables as desired.

Accordingly, the processing of step 343-1 results in determination of the "expected arrival time" of the customer based on the geolocation of the customer. After the processing of step 343-1, the process passes to step 343-2.

In step 343-2, the RS compares the expected arrival time of the customer with the planned reservation time of the customer to determine a differential. For example, the customer might have a 7 PM reservation time. Further, the expected arrival time of the customer might be 7:09 PM. Accordingly, the processing of FIG. 13 then processes such differential of 9 minutes to generate an appropriate communication for sending to the user and/or an appropriate communication to be sent to the restaurant.

Accordingly, in step 343-3, the RS performs decisioning to determine whether the customer is in the restaurant. If "yes", then the processing passes to step 343-3'. Such step 343-3' shows predetermined communications to be sent to the customer and to the restaurant respectively. After the processing of step 343-3', the process passes to step 343-8.

If it is determined in step 343-3 that the customer is not at the restaurant, then the processing advances to step 343-4. In step 343-4, the RS determines whether the differential is less than 0 (zero). Accordingly, such determination yields a result showing whether the customer is disposed to arrive on time or earlier than the customers reservation time.

Accordingly, if "yes" in step 343-4, the processing passes to step 343-4'. Step 343-4' shows a predetermined communication to be sent to the customer, i.e., "You are on schedule for "on time" arrival at Polios!" Step 343-4' also shows a predetermined communication to be sent to the restaurant, i.e., "Customer Jordan Doe is on schedule for "on time" arrival." After the processing of step 343-4', the process passes to step 343-8 of FIG. 13.

On the other hand, if it is determined that the differential is not less than 0 in step 343-4, then such determination indicates to the RS that the customer is running late to the venue. In such situation, the processing passes to step 343-5. In step 343-5, processing is performed to determine whether the differential is less than some suitable threshold time, such as 15 minutes as illustrated in FIG. 13. If the differential is indeed less than 15 minutes (or some other suitable threshold as desired), then the processing passes to step 343-5'. In such step 343-5' the RS maps the disposition of the user to predetermined communications to be sent to the user and to the restaurant. For example, the communication to the user may simply reflect that the user is running late and query whether everything is okay. The communication sent to the restaurant may simply reflect the disposition of arrival of the customer. After the processing of step 343-5', the process passes to step 343-8.

On the other hand, it may be determined in step 343-5 that the differential is greater than the threshold amount. Accordingly, such determination is indicative that the user is substantially late in arrival for the event. Based on such determination, the processing passes to step 343-7. In step 343-7, the RS maps the disposition of the user to predetermined communications to be sent to the user and/or the restaurant. Such communications may reflect that the user is substantially late. After step 343-7, the processing passes to step 343-8.

In step 343-8, the process returns to FIG. 12, and more specifically to step 344 of FIG. 12. Accordingly, in the processing of step 13, the disposition of the customer, regarding arrival of the customer at the particular event, is determined and a particular communication to be sent to the user and/or the restaurant is determined. Upon return to the processing of FIG. 12, that communication(s) is then output to the restaurant and/or the customer and 7 344.

Accordingly, the processing of FIG. 13 is concluded.

Figure 14:
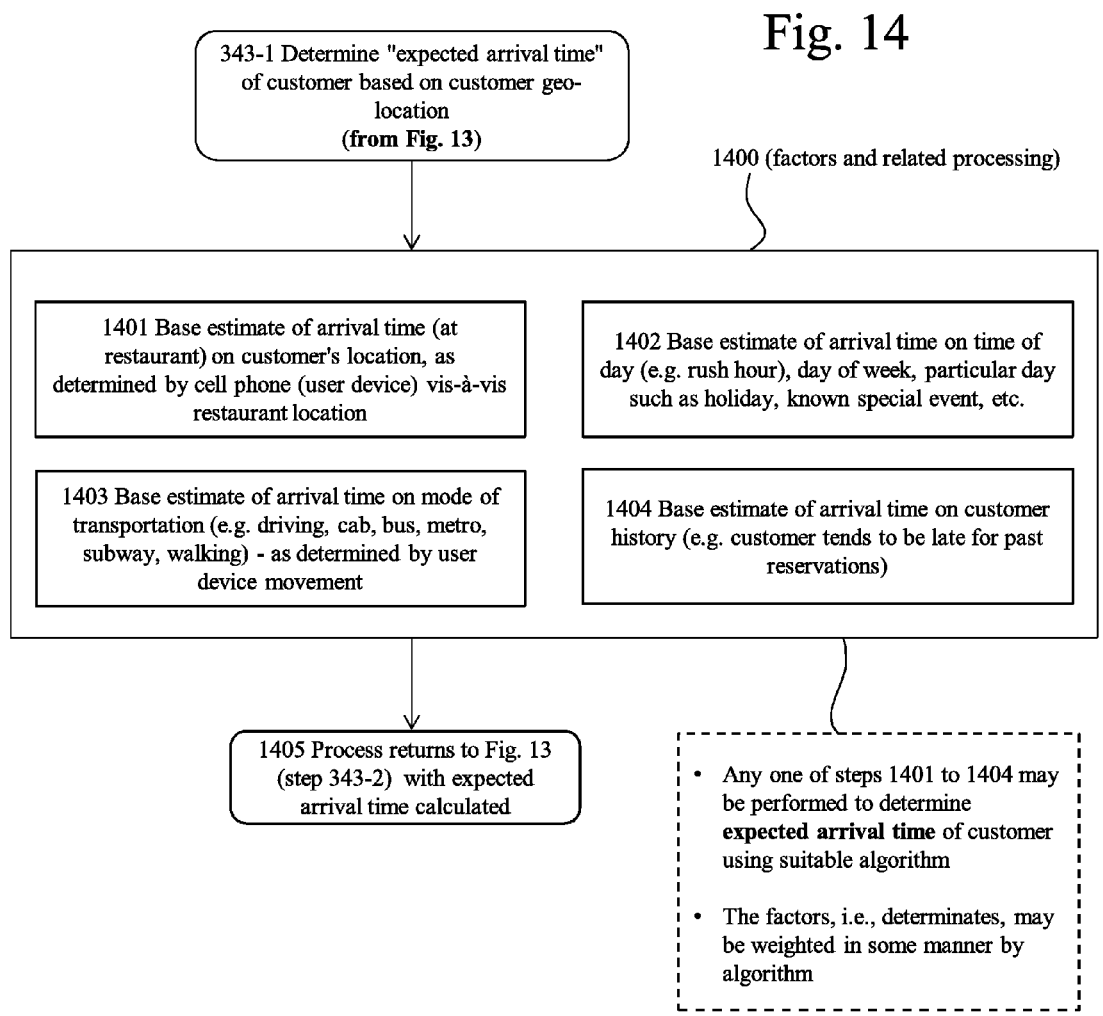
FIG. 14 is a flowchart showing details of determination of the "expected arrival time" of the user based on the geolocation of the user (showing details of FIG. 13) in accordance with one embodiment of the invention.

FIG. 14 is a flowchart showing details of determination of the "expected arrival time" of the user based on the geolocation of the user (showing details of step 343-1 of FIG. 13) in accordance with one embodiment of the invention. As shown, processing starts in step 343-1 of FIG. 14 and passes to step 1400.

Step 1400 of FIG. 14 shows various factors and related processing that may be utilized to determine the expected arrival time of the customer based on the user's location. It is appreciated that any one of steps 1401 to 1404 may be performed to determine the expected arrival time of the user, using a suitable algorithm. It is further appreciated that the factors, i.e. determinants, shown in FIG. 14 may be weighted in some manner by the algorithm. Illustratively, the processing implemented by the RS (i.e. the algorithm implemented by the RS) may simply calculate the expected arrival time at the venue of the restaurant based on the customer's location and current known traffic conditions. The RS may utilize prior arrival history of the customer weighted in some way to manner.

The various processing shown in step 1400 may be performed in combination, separately, in parallel to each other, or serially, as desired. Illustratively, FIG. 14 includes processing of step 1401. In step 1401, the RS bases the estimate of arrival time on the customer's location, as determined by cell phone or other user device, vis-à-vis the location of the restaurant. In step 1402, the RS bases the estimate of arrival time on the time of the day, day of week, particular day such as holiday, or known special events. Accordingly, if the arrival time of the customer is during a known rush hour, such disposition is taken into account in the processing performed by the RS. In step 1403, the RS bases the estimate of arrival time on the mode of transportation as that mode can be determined by the RS. For example, the RS may be able to determine the particular mode of transportation based on attributes of movement of the customer as compared with known patterns associated with a respective mode of transportation. Accordingly, the RS may be able to determine whether the customer is traveling via driving a vehicle, riding in a cab, riding a bus, riding subway or metro transportation, or walking, for example. In particular, such processing may be performed based on observed movement of the customer's user device. In addition, in the processing of step 1404, the RS may base the estimate of arrival time, at least in part, on customer history. For example, such customer history might reflect that the customer tends to be late for past reservations. In addition, historical data associated with the customer may reflect that the customer tends to arrive earlier (or later) then the ETA calculated by the RS. Such historical data as well as various other attributes may be taken into account as desired. Such historical data and various other attributes may be weighted in some manner, as desired. Such weighting might be based on an assessment of which attributes affect arrival time more than other attributes.

Accordingly, the processing passes to step 1405. Step 1405 reflects that the expected arrival time of the customer has been calculated. The processing then returns to step 343-2 of FIG. 13.

Figure 15A:
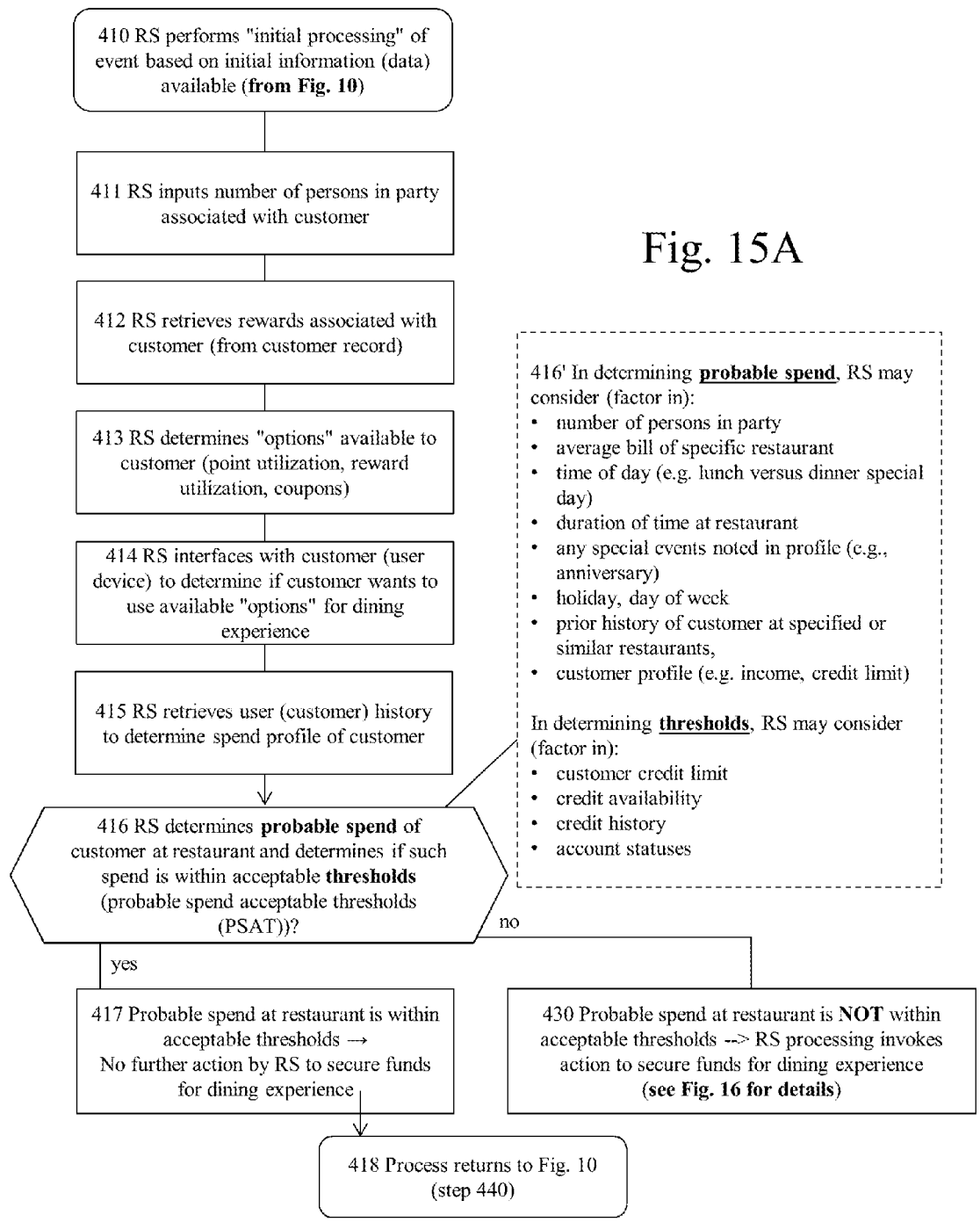
FIG. 15A is a flowchart showing the RS performing "initial processing" of the event based on initial information (data) available (showing details of FIG. 10) in accordance with one embodiment of the invention.

FIG. 15A is a flowchart showing the RS performing "initial processing" of the event based on initial information (data) available (showing details of step 410 of FIG. 10) in accordance with one embodiment of the invention. As shown, processing starts in step 410 of FIG. 15A and passes to step 411.

In step 411, the RS inputs the number of persons in the party associated with the customer. Then, in step 412, the RS may retrieve rewards or other preference points associated with the customer, such as from a suitable customer record. Then, in step 413, the RS determines "options" available to the customer. Such options might include point utilization, reward utilization, and/or coupons that are available to the customer. Then, processing passes to step 414.

In step 414, the RS interfaces with the customer, via the user device, to determine if the customer wants to use available "options" for his or her dining experience. Then, in step 415, the RS retrieves the customer history to determine spend profile of the customer. After the processing of step 415, process passes to step 416.

In step 416, the RS determines the probable spend of the customer at the restaurant and, in addition, determines if such probable spend is within acceptable thresholds, herein characterized as PSAT (probable spend acceptable thresholds). As shown in step 416' of FIG. 15A, the processing performed in step 416 may consider, i.e. factor in, a variety of parameters. Such parameters may include the number of persons in the party, the average bill at a particular restaurant, the time of day of the event, the historical duration of time at the restaurant, any special events noted in the profile (such as an anniversary), whether the event is on a holiday or particular day of the week, the prior history of the customer at the particular restaurant or at similar restaurants, and in particular the customer profile. The customer profile may include the income of the customer and in particular the credit limit available on a designated payment mechanism.

Hand in hand with determining the probable spend of the customer for the event, the RS also determines thresholds associated with the event. In determining thresholds, the RS may consider, i.e. factor in, the customer credit limit for the particular payment mechanism, the credit availability of the customer and the payment mechanism, the credit history of the customer, and/or the status of one or more accounts associated with the customer.

Accordingly, in the processing of step 416 of FIG. 15A, the RS determines whether the probable spend of the customer for the event IS or is NOT within acceptable thresholds. If the probable spend is within acceptable thresholds, then the processing passes from step 416 to step 417. Step 417 reflects the probable spend at the restaurant is within acceptable thresholds—and that no further action by the RS is needed to secure funds for the dining experience. However, it is appreciated that such conclusion of step 416 reflects initial decisioning of the RS for the particular event. Subsequent to such initial decisioning, as described below with reference to FIG. 15B, the RS performs further monitoring of the event to continuously monitor (based on observed events output to the RS) whether or not the probable spend of the customer at the restaurant is within acceptable thresholds.

On the other hand, it may be determined in step 416 of FIG. 15A, that the probable spend of the customer is not within acceptable thresholds. Accordingly, based on such determination, the processing passes from step 416 to step 430.

Accordingly, step 430 reflects a determination that the probable spend is not within acceptable thresholds. As a result, the processing of the RS invokes action to secure funds for the dining experience. In other words, the RS has determined that "no-swipe" processing is not available to the customer—based on the probable spend of the customer vis-à-vis the thresholds (PSAT) established for that customer. For example, based on the factors set forth in step 416', the RS may determine that the probable spend for the event is $800. In accord with one embodiment of the invention, the thresholds associated with the event may indeed be simply the customer credit limit associated with the payment mechanism associated with the "no-swipe" processing for the customer. Accordingly, if the credit limit for the customer (of the designated payment mechanism) is determined to be $500, then the threshold may be set to be that same $500. Accordingly, since the probable spend of $800 extends beyond the threshold of $500, the processing of step 430 (i.e. FIG. 15A) would be invoked.

In accordance with embodiments of the invention, the processing invoked by the RS to secure funds for the dining experience is described in further detail below with reference to FIG. 16.

With further reference to step 416 of FIG. 15A—after step 417, processing passes to step 418. In step 418, the process returns to FIG. 10, and specifically passes to step 440 of FIG. 10.

Figure 15B:
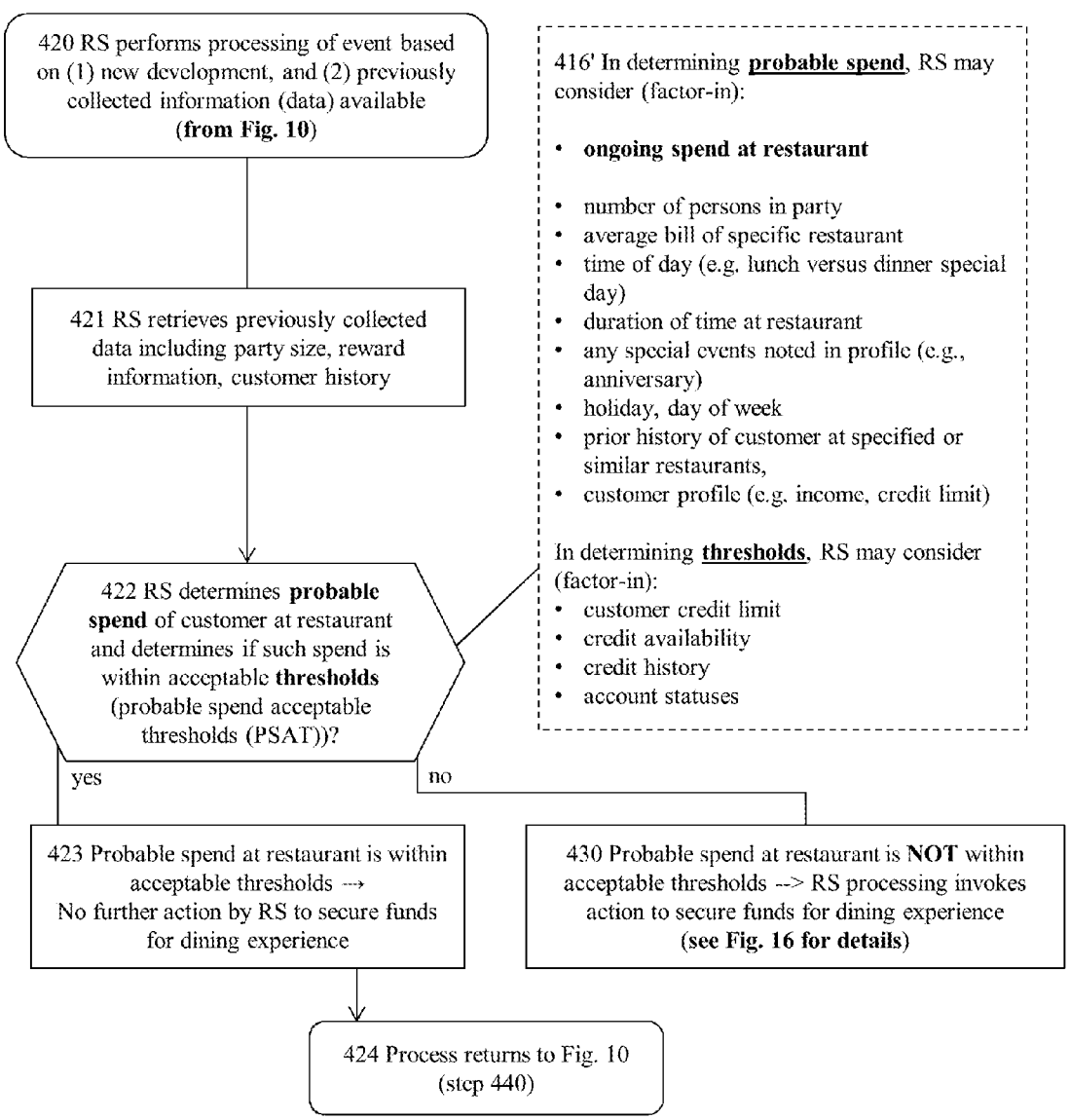
FIG. 15B is a flowchart showing the RS performing processing of an event based on (1) a new development observed at the event, and (2) previously collected information (data) available regarding the event (showing details of FIG. 10) in accordance with one embodiment of the invention.

FIG. 15B is a flowchart showing the RS performing processing of an event based on (1) a new development observed at the event, and (2) previously collected information (data) available regarding the event (showing details of step 420 of FIG. 10) in accordance with one embodiment of the invention. As shown, processing starts in step 420 of FIG. 15B and passes to step 421.

The processing of FIG. 15B is similar in nature to the processing of FIG. 15A. However, the processing shown in FIG. 15A takes into account an observed development of the event. Upon observing a development in the event, the RS reassesses the probable spend of the event and may reassess thresholds associated with the event. For example, a development might be constituted by the customer ordering an item exceeding $20.

As shown, processing of FIG. 15B starts in step 420 and passes to step 421. In step 421, the RS retrieves previously collected data including party size, reward information, customer history, and/or various other data associated with the particular event including historical data associated with the customer and/or the event, for example. After step 421, the processing passes to step 422.

In step 422, the IRS determines the probable spend of the customer at the restaurant and determines if such probable spend is within acceptable thresholds. Accordingly, such processing is similar in nature to the processing of step 416 in FIG. 15A. However distinct from step 416 of FIG. 15A—in step 422 the RS further determines ongoing spend at the restaurant. As noted above, such ongoing spend might be in the form of a customer ordering an additional item and thereby incurring additional cost associated with the event, for example.

If the RS determines in step 422 that probable spend is indeed within acceptable thresholds, then the processing passes to step 423. Step 423 of FIG. 15B reflects that the probable spend at the restaurant is indeed within acceptable thresholds—and that no further action is needed by the RS to secure funds for the particular event.

After step 423 of FIG. 15B, the process passes to step 424. In step 424, the process returns to FIG. 10, and specifically passes to step 440 of FIG. 10.

On the other hand, if the processing of step 422 the system determines that the probable spend of the customer at the restaurant is not within acceptable thresholds, then the processing passes to step 430. Step 430 reflects such disposition—and RS processing invokes action to secure funds for the dining experience. Further details are described with reference to FIG. 16 below.

Figure 16:
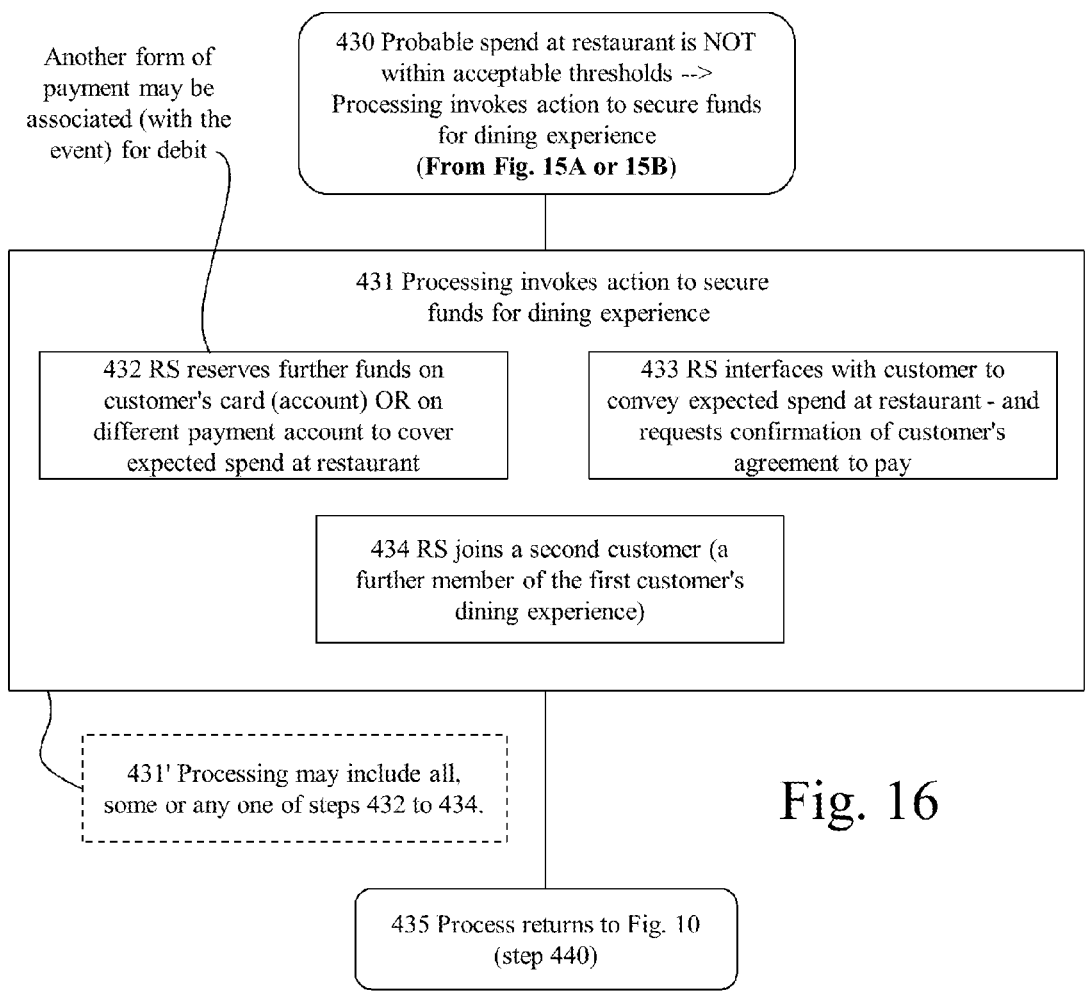
FIG. 16 is a flowchart showing processing performed in a situation in which the probable spend of the customer is not within acceptable thresholds—and the RS invokes processing to secure funds for the dining experience (showing details of FIG. 15A and FIG. 15B) in accordance with one embodiment of the invention.

FIG. 16 is a flowchart showing processing performed in a situation in which the probable spend of the customer is not within acceptable thresholds—and the RS invokes processing to secure funds for the dining experience (showing details of step 430 of either FIG. 15A or FIG. 15B) in accordance with one embodiment of the invention. Accordingly, the processing of FIG. 16 may be invoked from either the processing of FIG. 15A or the processing of FIG. 15B.

As shown in FIG. 16, processing starts in step 430 of FIG. 16 and passes to step 431. Step 431 illustrates processing that may be performed to secure funds for the dining experience. As shown in box 431', the processing of FIG. 16 may include all, some, or any one of steps 432 to 434.

As shown in step 432, the RS may perform processing in which the RS reserves further funds on the customer's card or other payment account. Also, the RS may reserve further funds on a different payment account of the customer to cover expected spend at the restaurant.

As shown in step 433, the RS may perform processing in which the RS interfaces with the customer to convey the expected spend at the restaurant to the customer. Such communication may request a confirmation of the customers agreement and/or ability to pay.

In addition, as shown in step 434 of FIG. 16, the RS may perform processing in which the RS joins an additional customer in the assessment of probable spend vis-à-vis acceptable thresholds associated with the event. Such analysis for a second and any additional customers (associated with the event) may be performed using any of the factors set forth in box 416' (FIG. 15B) as described above.

It is appreciated that the processing shown in step 431 FIG. 16 is illustrative. It should be appreciated that various other steps may be performed by the RS to secure additional funds for the particular event—such that probable spend for the event is indeed within acceptable thresholds.

After step 431 FIG. 16, processing passes to step 435. In step 435, the process returns to FIG. 10, and specifically passes to step 440 of FIG. 10.

Figure 17:
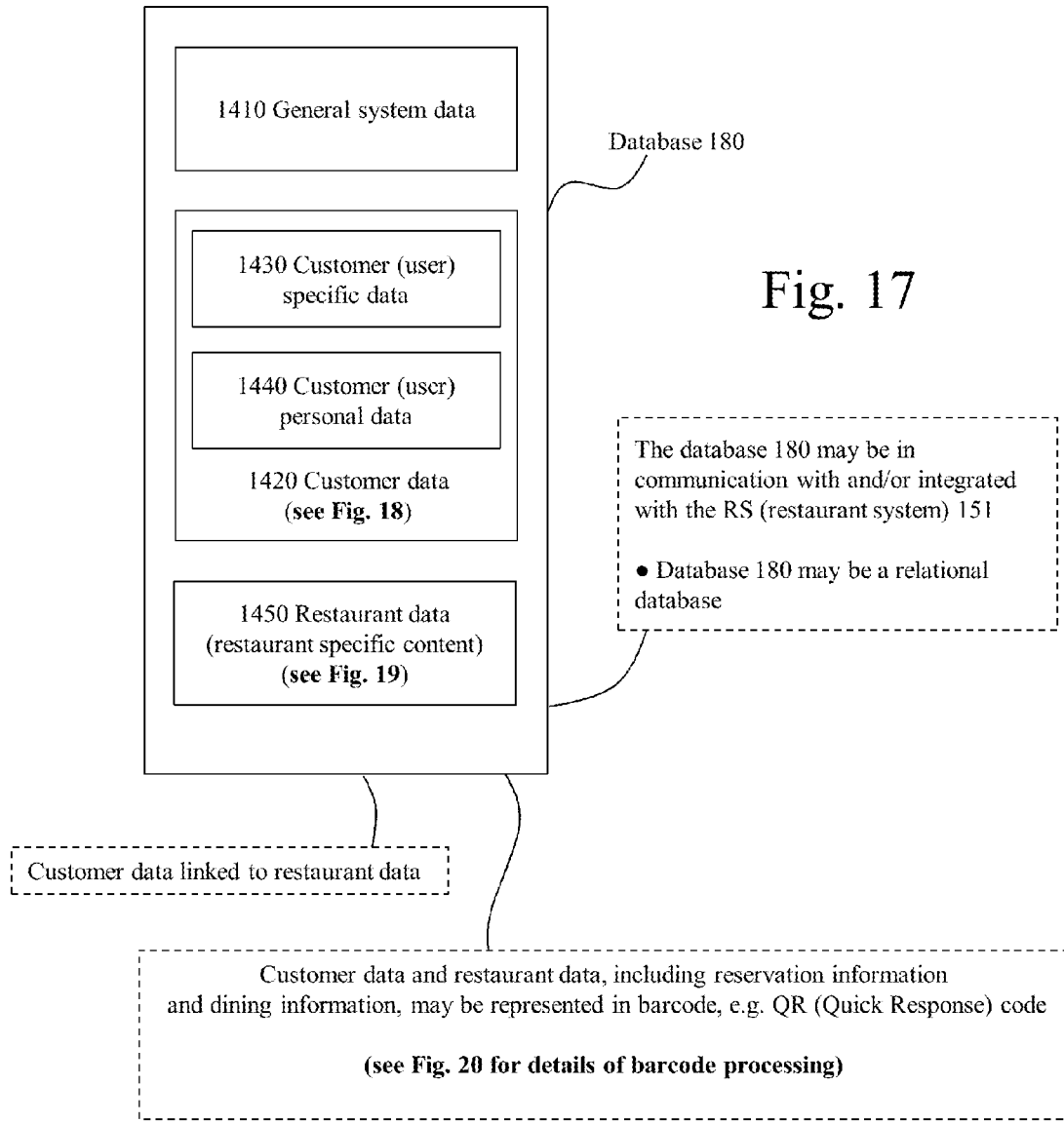
FIG. 17 is a block diagram showing details of the database of FIG. 1, in accordance with one embodiment of the invention.

Upon the processing returning to FIG. 10, in step 440, processing is continued as described above In description of further aspects of the invention, FIG. 17 is a block diagram showing details of the database 180 of FIG. 1, in accordance with one embodiment of the invention.

The database 180 stores various data used by and/or generated by the RS 151. The database 180 may be in communication with or integrated with the RS 151 and some suitable manner, such as via a network arrangement.

As shown in FIG. 17, the database 180 includes general system data 1410, customer data 1420 and restaurant data 1450. The general system data 1410 reflects a wide variety of data generated by the RS 151 and/or used by the RS 151. For example, such general system data might include instructions for performing the various processing described herein.

The database 180 further includes customer data 1420. The customer data 1420 may include what is herein characterized as customer specific data 1430 and customer personal data 1440. Further details of such customer data 1420 are described below with reference to FIG. 18.

The database 180 also includes restaurant data 1450. Further details of the restaurant data 1450 are described below with reference to FIG. 19. It is appreciated that the customer data 1420 may be linked to the restaurant data 1450 in some suitable manner, such as using the "data anchor" EI code described herein. The customer data and/or restaurant data, including reservation information and dining information, may be represented (captured) in a barcode for use on a user device (such as a customer smart phone), use by an LRS 161, or use by the RS 151, for example.

Figure 18:
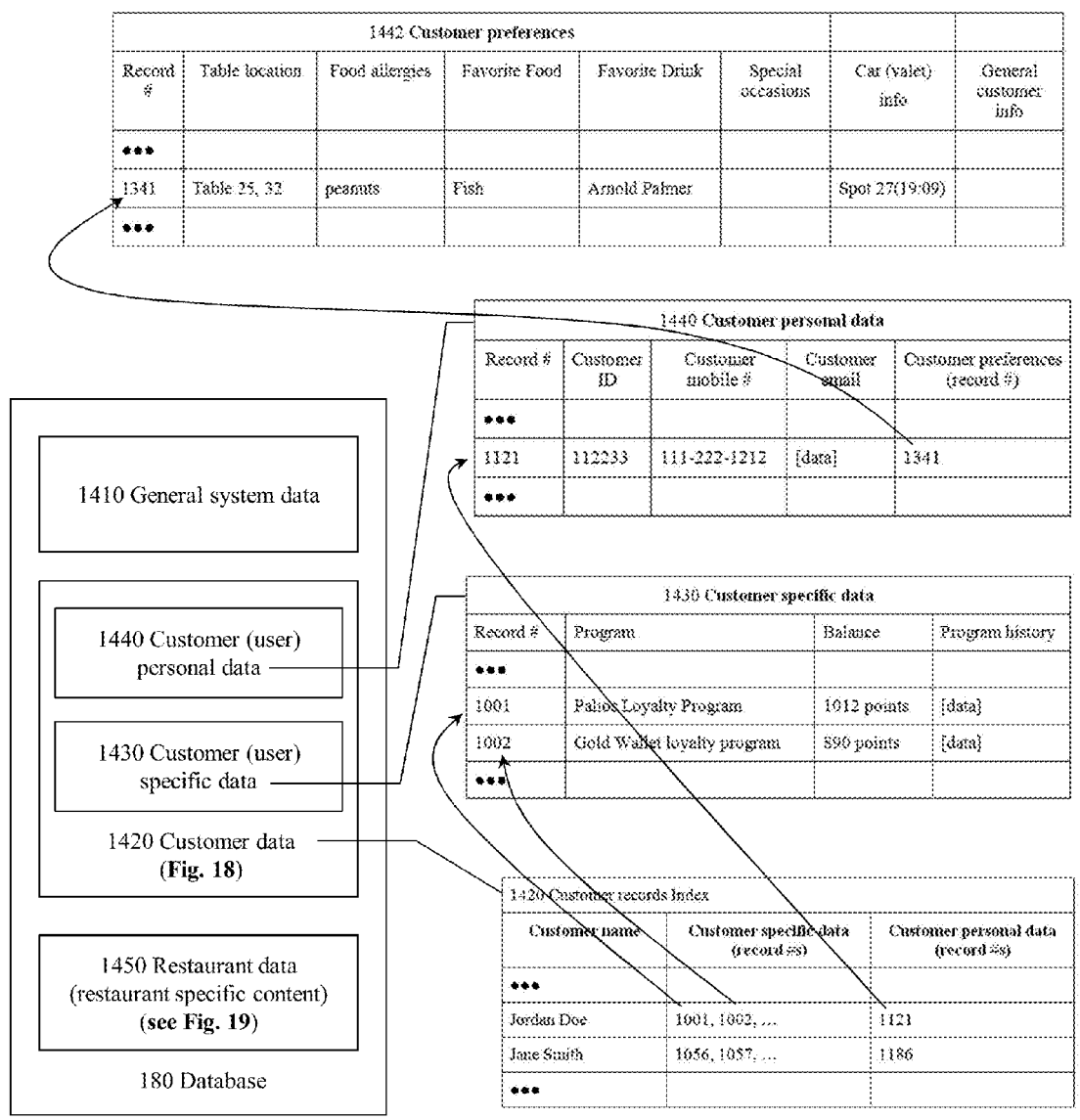
FIG. 18 is a block diagram showing further details of the database 180 (and specifically the customer data) of FIG. 17, in accordance with one embodiment of the invention.

FIG. 18 is a block diagram showing further details of the database 180 (and specifically the customer data 1420) of FIG. 17, in accordance with one embodiment of the invention. The customer data 1450 may utilize a relational database, for example. Such relational database arrangement may utilize a customer records index 1420 as shown in FIG. 18. Each customer may be provided with a record in the customer records index 1420. Such record may be linked to customer specific data 1430 and customer personal data 1440. The customer specific data 1430 may include banking information associated with the customer, such as loyalty program information. On the other hand, the customer personal data 1440 may include information more personal to the customer, such as customer preference data 1442.

Figure 19:
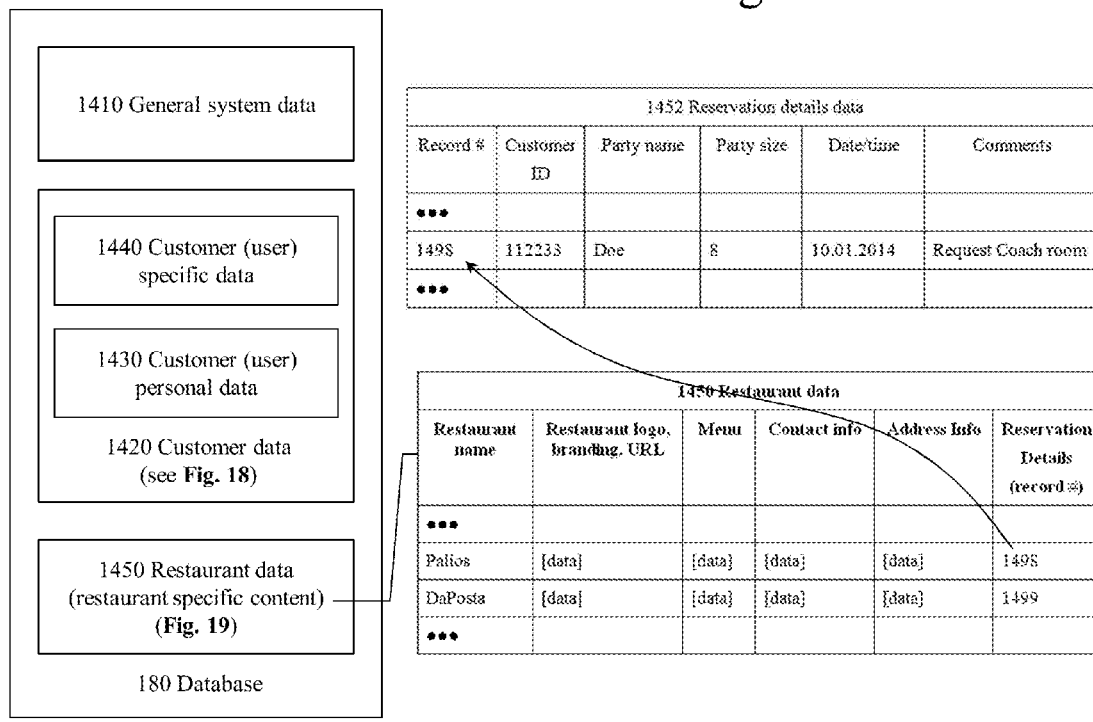
FIG. 19 is a block diagram showing further details of the database 180 (and specifically the customer data) of FIG. 17, in accordance with one embodiment of the invention.

FIG. 19 is a block diagram showing further details of the database 180 (and specifically the customer data 1450) of FIG. 17, in accordance with one embodiment of the invention. The restaurant data 1450 may also utilize a relational database arrangement. As shown in FIG. 19, the restaurant data 1450 might be organized in the form of records associated respectively with restaurants. Each record for a restaurant may include a variety of information including restaurant name, restaurant logo, menu information, contact information, address information, and reservation details. As shown in FIG. 19, the restaurant data 1450 includes reservation details associated with a pointer 1498 (in the Palios) record. In turn, such reservation details 1452 may include customer ID, party name, party size, date/time information and comments, for example. In addition, it is appreciated that the reservation details may be linked to an EI code—for the particular event for the particular customer.

As described herein, various processing performed by the RS and/or the LRS includes barcode processing or relates to barcode processing. Is appreciated that such "barcode processing" as described herein may relate to any indicia which is associated with and representative of corresponding data. Accordingly, any of a variety of barcode types might be utilized in conjunction with the invention including a QR code and/or a two-dimensional barcode, for example.

Figure 20:
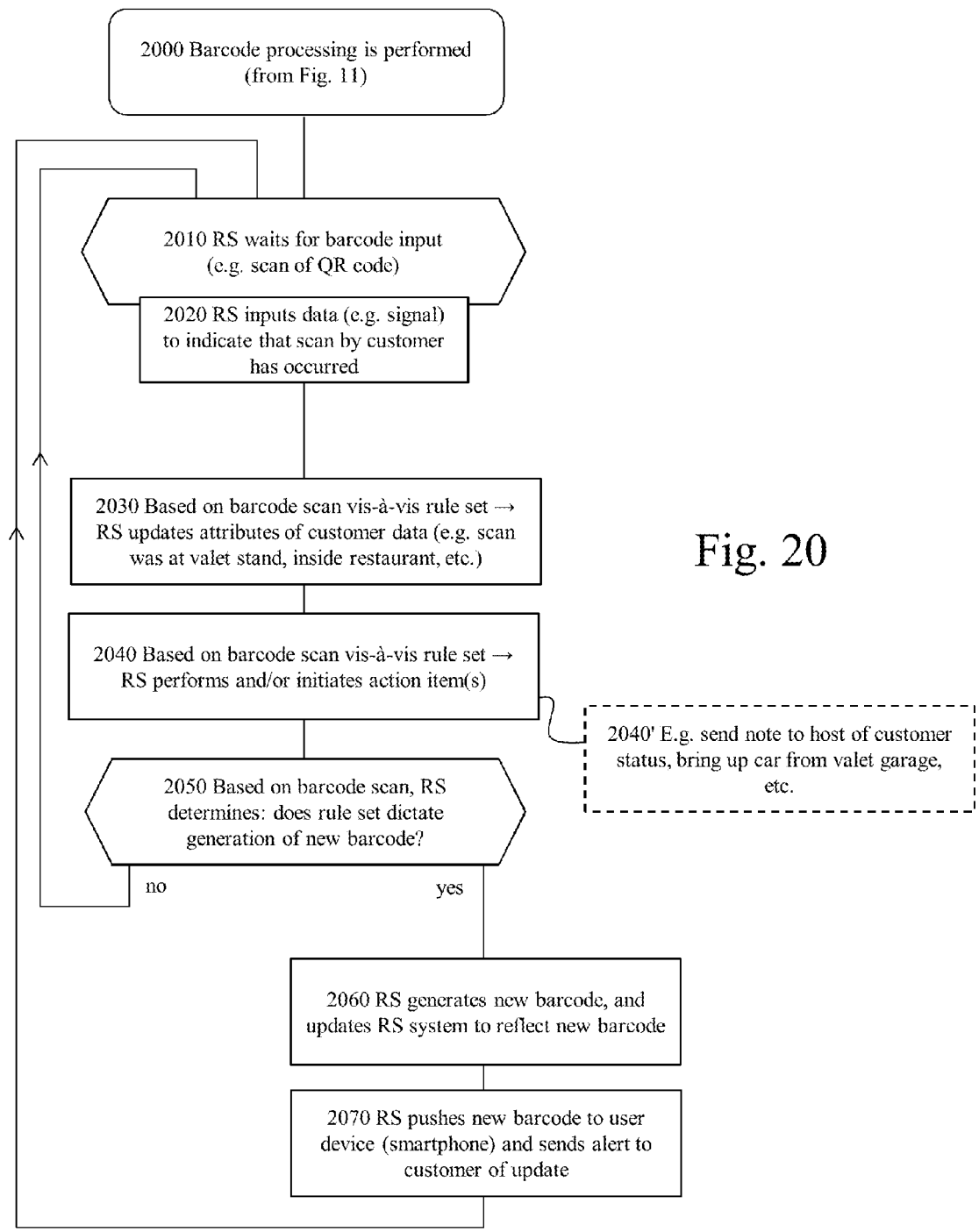
FIG. 20 is a flowchart showing aspects of barcode processing in accordance with one embodiment of the invention.

In particular, the processing described herein includes the scan of a barcode and the generation of new barcodes. FIG. 20 is a flowchart showing aspects of barcode processing in accordance with one embodiment of the invention. For example, the processing of FIG. 20 relates to FIG. 11 described above.

As shown, the processing of FIG. 20 starts in step 2000 and passes to step 2010. In step 2010, the RS waits for barcode input. For example, such barcode input might be constituted by a customer approaching a particular terminal for entry of a QR code. Step 2020 reflects that the RS inputs data, such as a signal, to indicate that a scanned by a customer has occurred. Then, the processing passes to step 2030.

In step 2030, based on the barcode scan vis-à-vis a rule set, the RS updates attributes of customer data. For example, the scan might occur at a valet stand at a restaurant or inside a restaurant. Upon inputting the scan from the customer, the RS maps the graphical image observed into a corresponding data set. Based on a suitable rule set, the data set is then updated to reflect the observed condition. For example, the data associated with the customer is updated to reflect that the customer is inside the particular restaurant for an event.

As illustrated in FIG. 20, after the processing of step 2030, the process passes to step 2040. In step 2040, based on the barcode scan vis-à-vis a rule set, the RS performs and/or initiates action item or items. For example, as reflected in box 2040', a particular barcode scan might result in a predetermined communication being sent to a host at the restaurant regarding the customer status.

It is appreciated that the processing of step 2030 and 2040 may be performed in parallel, in serial, and/or in some combination of steps 2030 and 2040.

It is appreciated that in some processing of the systems and methods of the invention, the processing performed by the RS and/or the LRS dictates that a new barcode is generated. For example, in some embodiments of the invention, a new barcode is generated upon the customer arriving at the venue of an event. Such new barcode includes various information regarding customer, venue, and in particular includes the EI code described above.

Accordingly, step 2050 of FIG. 20 reflects a situation in which (based on a barcode scan) the RS determines whether or not the rule set dictates the generation of a new barcode scan. Accordingly, if the rule set does not dictate generation of a new barcode, then the processing passes back to step 2010—in which the RS waits for further barcode input.

On the other hand, if "yes" in step 2010, i.e. the RS determines that the pertinent rule set does indeed dictate generation of new barcode, then the processing passes to step 2060. In step 2060, the RS generate such new barcode and updates the RS system to reflect such new barcode.

Hand-in-hand with the processing of step 2060, in step 2070, the RS pushes the new barcode to the user device, such as the customer smart phone. In addition, the RS may send an alert to the customer of the updated barcode. For example, the RS might send an e-mail to the customer regarding the updated barcode.

Figure 21:
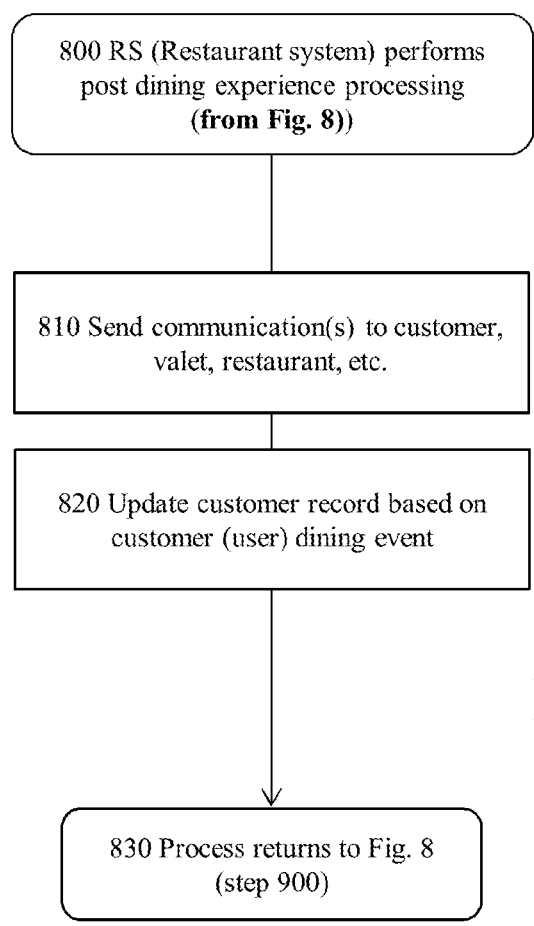
FIG. 21 is a flowchart showing aspects of the RS performing post-dining experience processing (providing further details of FIG. 8) in accordance with one embodiment of the invention.

FIG. 21 is a flowchart showing aspects of the RS 151 performing post-dining experience processing (providing further details of step 800 of FIG. 8) in accordance with one embodiment of the invention.

As shown, the processing starts in step 800 and passes to step 810. In step 810, the RS 151 sends one or more communications to the customer, restaurant (e.g. restaurant system 151) and/or an affiliated valet, for example. Then, in step 820, the RS updates the customer record based on the customer dining event. Such update of the customer record might include any data collected during the course of the event—such as data regarding the arrival of the customer, data regarding the menu choices of the customer, data regarding the now-completed accrual of costs associated with the event, and/or data regarding payment for the event by the customer, for example.

As otherwise described herein, it is of course appreciated that the systems and methods of the invention are not limited to a dining event. Rather, the systems and methods of the invention may be utilized with a wide variety of events, including events in which there is an ongoing accrual of costs to the customer.

After step 820 of FIG. 21, the process passes to step 830. In step 830, the process returns to FIG. 8, and specifically passes to step 900 of FIG. 8.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for enhanced cardless payment performed for an event, the method performed by a system comprising a computer processor coupled to a memory configured to execute programmed instructions stored in the memory, the method performed by the system comprising:
    receiving, from a customer, a customer identifier and an indication that the customer will use a cardless payment feature for the event, wherein the customer identifier is associated with a messaging address and a payment account;
    the system monitoring a sales transaction of at least one good or service to the customer during the event;
    the system performing processing, at the beginning of the event, to determine cardless payment feature availability including:
        determining a probable spend of the customer for the event;
        determining a probable spend acceptable threshold (PSAT) for the event;
        comparing the probable spend of the customer versus the PSAT, and based on such comparing determining that the probable spend is within PSAT and, based on such determination, determining that the cardless payment feature is available to the customer;
    receiving from the customer, through the cardless payment feature, a selection of a good or service associated with the event;
    the system observing a triggering development during the course of the event, such observing triggering the system to perform further processing to determine cardless payment feature availability during the course of the event for the customer, wherein the system observing a triggering development during the course of the event is constituted by the system:
        inputting data indicating that the customer has incurred an additional expense item during the course of the event; and
        in response to the input of additional expense data, automatically determining that such additional expense constitutes a triggering development by comparing the value of the additional expense against a threshold expense; and determining whether the value of the additional expense exceeds the threshold expense;
    the system generating an invoice for the good or service in response to the cardless payment feature;
    the system transmitting, over at least one network, the invoice to the customer's messaging address;
    the system receiving, over the at least one network, an approval for the invoice from the customer; and
    the system charging the customer's account for the invoice.

2. The method of claim 1, the further processing to determine cardless payment feature availability during the course of the event for the customer includes the system:
    determining a second probable spend of the customer for the event;
    determining a second probable spend acceptable threshold (PSAT) for the event;
    comparing the second probable spend of the customer versus the second PSAT, and based on such comparing determining that the second probable spend is within the second PSAT and, based on such determination, determining that the cardless payment feature is available to the customer.

3. The method of claim 1, the further processing to determine cardless payment feature availability during the course of the event for the customer includes the system:
    determining a second probable spend of the customer for the event;
    determining a second probable spend acceptable threshold (PSAT) for the event;
    comparing the second probable spend of the customer versus the second PSAT, and based on such comparing determining that the second probable spend is NOT within the second PSAT and, based on such determination, determining that the cardless payment feature is NOT available to the customer.

4. The method of claim 3, the system interfacing with the customer to input further data to result in an increased PSAT such that the second probable spend of the customer is within the increased PSAT.

5. The method of claim 4, the further data constituted by an additional payment account.

6. The method of claim 4, the further data constituted by the system reserving further funds on the payment account.

7. The method of claim 4, the further data constituted by inputting data from the customer indicative of customer ability to pay.

8. The method of claim 1, wherein the determining that such additional expense constitutes a triggering development includes the system taking into account the total cost of the event for the customer.

9. The method of claim 1, wherein determining the probable spend of the customer includes the system taking into account at least one of number of persons in party, average bill of event venue, time of day, duration of time at restaurant, special events, special day, day of week, holiday, day of week, prior history of customer at specified or similar venue, customer profile, customer income, and customer credit limit.

10. The method of claim 1, wherein determining the PSAT includes the processing taking into account at least one of customer credit limit, credit availability, credit history, and account status.

11. The method of claim 1, further comprising the system generating an EI Code (Event Identifier code) for the event for the customer, and associating such EI code with various particulars associated with the event.

12. The method of claim 1, further comprising determining, by the system, an arrival time of the customer at the event comprising:
    determining a geolocation of the customer;
    determining a geolocation of a venue for the event;
    determining an ETA (estimated time of arrival) of the customer at the venue;

comparing the ETA with a previously set reservation time to determine a differential between the ETA and the reservation time; and determining a communication to at least one of the customer and the restaurant based on the differential;

outputting a communication to at least one of the customer and the restaurant based on the differential.

13. The method of claim 12, the comparing the ETA with a previously set reservation time to determine a differential between the ETA and the reservation time includes:

Determining a mode of transportation of the customer.

14. The method of claim 12, the determining the ETA of the customer at the venue is based on at least one selected from the group consisting of history of the customer, day of week and hour of day.

15. The method of claim 1, wherein the event is a dining experience of the customer.

16. A system to provide enhanced cardless payment performed for an event, the system comprising a computer processor coupled to a memory configured to execute programmed instructions stored in the memory, the system comprising:

a communication portion of the system receiving, from a customer, a customer identifier and an indication that the customer will use a cardless payment feature for the event, wherein the customer identifier is associated with a messaging address and a payment account;

the computer processor monitoring a sales transaction of at least one good or service to the customer during the event;

the computer processor performing processing to determine cardless payment feature availability including:

determining a probable spend of the customer for the event;

determining a probable spend acceptable threshold (PSAT) for the event;

comparing the probable spend of the customer versus the PSAT, and based on such comparing determining that the probable spend is within PSAT and, based on such determination, determining that the cardless payment feature is available to the customer;

the communication portion receiving from the customer, through the card less payment feature, a selection of a good or service associated with the event;

the computer processor observing a triggering development during the course of the event, such observing triggering the system to perform further processing to determine cardless payment feature availability during the course of the event for the customer, wherein the system observing a triggering development during the course of the event is constituted by the system:

inputting data indicating that the customer has incurred an additional expense item during the course of the event; and in response to the input of additional expense data, automatically determining that such additional expense constitutes a triggering development by comparing the value of the additional expense against a threshold expense; and determining whether the value of the additional expense exceeds the threshold expense;

the computer processor generating an invoice for the good or service in response to the cardless payment feature;

the computer processor transmitting, over at least one network, the invoice to the customer's messaging address;

the computer processor receiving, over the at least one network, an approval for the invoice from the customer; and the computer processor charging the customer's account for the invoice.

17. A non-transitory computer readable medium that provides enhanced cardless payment performed for an event, the computer readable medium implemented with a computer processor to execute programmed instructions stored on the computer readable medium, the computer readable medium comprising:

a first portion receiving, from a customer, a customer identifier and an indication that the customer will use a cardless payment feature for the event, wherein the customer identifier is associated with a messaging address and a payment account;

a second portion monitoring a sales transaction of at least one good or service to the customer during the event;

the second portion performing processing to determine cardless payment feature availability including:

determining a probable spend of the customer for the event;

determining a probable spend acceptable threshold (PSAT) for the event;

comparing the probable spend of the customer versus the PSAT, and based on such comparing determining that the probable spend is within PSAT and, based on such determination, determining that the cardless payment feature is available to the customer;

the first portion receiving from the customer, through the cardless payment feature, a selection of a good or service associated with the event;

the second portion observing a triggering development during the course of the event, such observing triggering the system to perform further processing to determine cardless payment feature availability during the course of the event for the customer, wherein the system observing a triggering development during the course of the event is constituted by the system:

inputting data indicating that the customer has incurred an additional expense item during the course of the event; and in response to the input of additional expense data, automatically determining that such additional expense constitutes a triggering development by comparing the value of the additional expense against a threshold expense; and determining whether the value of the additional expense exceeds the threshold expense;

the second portion generating an invoice for the good or service in response to the cardless payment feature;

the second portion transmitting, over at least one network, the invoice to the customer's messaging address;

the second portion receiving, over the at least one network, an approval for the invoice from the customer; and the second portion charging the customer's account for the invoice.

* * * * *